US010626666B2

(12) United States Patent
Junge et al.

(10) Patent No.: US 10,626,666 B2
(45) **Date of Patent: *Apr. 21, 2020**

(54) DEVICE FOR REGULATING THE PASSAGE OF LIGHT

(71) Applicant: Merck Patent GmbH, Darmstadt (DE)

(72) Inventors: Michael Junge, Pfungstadt (DE); Andreas Beyer, Hanau (DE); Ursula Patwal, Reinheim (DE); Peer Kirsch, Seeheim-Jugenheim (DE); Susann Beck, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/105,729

(22) PCT Filed: Nov. 26, 2014

(86) PCT No.: PCT/EP2014/003153

§ 371 (c)(1),
(2) Date: Jun. 17, 2016

(87) PCT Pub. No.: WO2015/090506

PCT Pub. Date: Jun. 25, 2015

(65) Prior Publication Data

US 2016/0319592 A1 Nov. 3, 2016

(30) Foreign Application Priority Data

Dec. 19, 2013 (EP) .................................... 13005935
Jan. 15, 2014 (EP) .................................... 14000141

(51) Int. Cl.

| | |
|---|---|
| ***C09K 19/34*** | (2006.01) |
| ***E06B 9/24*** | (2006.01) |
| ***C09K 19/60*** | (2006.01) |
| ***C09K 19/04*** | (2006.01) |
| ***C09K 19/30*** | (2006.01) |
| ***G02F 1/1343*** | (2006.01) |
| ***G02F 1/1347*** | (2006.01) |
| ***G02F 1/137*** | (2006.01) |

(52) U.S. Cl.

CPC ............ *E06B 9/24* (2013.01); *C09K 19/0403* (2013.01); *C09K 19/3003* (2013.01); *C09K 19/3068* (2013.01); *C09K 19/3405* (2013.01); *C09K 19/60* (2013.01); *C09K 19/601* (2013.01); *C09K 19/603* (2013.01); *C09K 19/606* (2013.01); *G02F 1/137* (2013.01); *G02F 1/13439* (2013.01); *G02F 1/13475* (2013.01); *C09K 2019/0407* (2013.01); *C09K 2019/0411* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3071* (2013.01); *C09K 2019/3078* (2013.01); *C09K 2019/3408* (2013.01); *C09K 2219/13* (2013.01); *E06B 2009/2464* (2013.01)

(58) Field of Classification Search

CPC ........................................................ G02F 1/13
See application file for complete search history.

(56) References Cited

U.S. PATENT DOCUMENTS

| | | | | |
|---|---|---|---|---|
| 5,969,154 A * | 10/1999 | Hao | C09K 19/3483 252/299.61 |
| 6,033,598 A * | 3/2000 | Kaneko | C09K 19/3001 252/299.1 |
| 6,066,598 A | 5/2000 | Ishikawa | |
| 7,442,419 B2 * | 10/2008 | Hirschmann | C09K 19/20 252/299.61 |
| 10,260,001 B2 * | 4/2019 | Junge | C09K 19/60 |
| 2008/0017836 A1 | 1/2008 | Saito | |
| 2014/0333985 A1 * | 11/2014 | Junge | G02F 1/0147 359/288 |
| 2019/0016955 A1 * | 1/2019 | Junge | C09K 19/3001 |

FOREIGN PATENT DOCUMENTS

| | | | |
|---|---|---|---|
| CN | 1178550 A | | 4/1998 |
| CN | 101698802 A | * | 4/2010 |
| CN | 101698802 A | | 4/2010 |
| CN | 102344815 A | | 2/2012 |
| DE | 10135247 A1 | | 5/2002 |
| JP | 2008024815 A | | 2/2008 |
| JP | 2011190314 A | | 9/2011 |
| WO | 1997017415 A1 | | 5/1997 |

OTHER PUBLICATIONS

International Search Report dated Feb. 19, 2015 issued in corresponding PCT/EP2014/003153 application (2 pages).
English Abstract of DE 10135247 A1 published May 16, 2002 (2 pages).
English Abstract of CN 102344815 A published Feb. 8, 2012 (1 page).
Office Action in corresponding CN 201480068767.6 dated Mar. 26, 2018.
Office Action in corresponding TW103144393 dated Jun. 8, 2018.
English translation of Office Action in corresponding JP application 2016-541058 dated Nov. 20, 2018 (pp. 1-9).
Office Action in corresponding EP 14805180.8 dated Oct. 1, 2018 (pp. 1-5).

* cited by examiner

*Primary Examiner* — Chanceity N Robinson
(74) *Attorney, Agent, or Firm* — Millen White Zelano and Branigan, PC

(57) ABSTRACT

The present application relates to a device for regulating the passage of light which is characterised in that it comprises a layer comprising a liquid-crystalline mixture containing a characteristic structural element.

21 Claims, No Drawings

DEVICE FOR REGULATING THE PASSAGE OF LIGHT

The present application relates to a device for regulating the passage of light, where the device comprises a layer which comprises a liquid-crystalline material comprising a dye compound and a compound containing a characteristic structural element.

For the purposes of the present application, the term light is taken to mean, in particular, electromagnetic radiation in the UV-A, VIS and NIR region. Again in particular, it is taken to mean light having a wavelength which is only absorbed to a small extent or not at all by the materials usually used in windows (for example glass). According to the definitions usually used, the UV-A region is taken to mean a wavelength of 320 to 380 nm, the VIS region is taken to mean a wavelength of 380 nm to 780 nm and the NIR region is taken to mean a wavelength of 780 nm to 2000 nm.

The light whose passage is being regulated by the device according to the invention is preferably taken to mean daylight. Daylight is light which emanates from the sun. Daylight preferably emanates directly from the sun. However, it may also emanate indirectly from the sun via mirroring, refraction, or via absorption and subsequent emission by any desired materials.

For the purposes of the present application, a liquid-crystalline material is taken to mean a material which has liquid-crystalline properties under certain conditions. The term liquid-crystalline properties is familiar to the person skilled in the art and is understood as usual in the area of physical chemistry. In the narrower sense, it is taken to mean that the material is liquid and has direction-dependent properties. The liquid-crystalline properties are typically dependent on the temperature. In the narrower sense, a liquid-crystalline material is therefore taken to mean a material which has liquid-crystalline properties in a temperature range which includes room temperature.

Devices for regulating the passage of light are switching devices which cover an area and hinder the passage of light through this area to a greater or lesser extent, depending on their switching state.

Devices of this type can be based on various mechanisms and can be, for example, thermally or electrically switchable. An example of an electrically switchable device for regulating the passage of light is disclosed in WO 2009/141295 and in the as yet unpublished applications WO 2014/090367 and WO 2014/090373.

The devices described therein comprise a layer comprising a liquid-crystalline material, where the liquid-crystalline material comprises at least one dye compound and at least one host material. The host material is a mixture of different liquid-crystalline compounds.

Although the devices disclosed in the above-mentioned prior art are highly usable and have satisfactory properties, there continues to be a demand for alternative devices. In particular, there is a demand for devices which have high stability of the layer comprising the liquid-crystalline material and thus have a long lifetime. In particular, it is desired for the liquid-crystalline material comprising the dye to be a stable solution and/or for no crystallisation or formation of new phases in the liquid-crystalline material, particularly at low temperatures, to occur. It is furthermore desired for the liquid-crystalline material of the device to have high anisotropy of the absorption.

In the context of the present invention, it has now been found, surprisingly, that, on use of a liquid-crystalline material in the device which has a clearing point of at least 95° C. and which has the characteristic structural features depicted below, devices having a very long lifetime and high stability to low temperatures are obtained.

The liquid-crystalline materials according to the invention comprising one or more dye compounds are distinguished by one or more, preferably all, of the properties mentioned below: high solubility of the dye compound, high long-term stability of the solution at room temperature and at low temperatures, and a high degree of anisotropy of the absorption.

The present application therefore relates to a device for regulating the passage of light which is characterised in that it comprises a layer comprising a liquid-crystalline material comprising a dye compound, where the liquid-crystalline material has a clearing point of at least 95° C. and comprises at least one compound V which contains at least one unit selected from units of the formulae (E-1), (E-2) and (E-3),

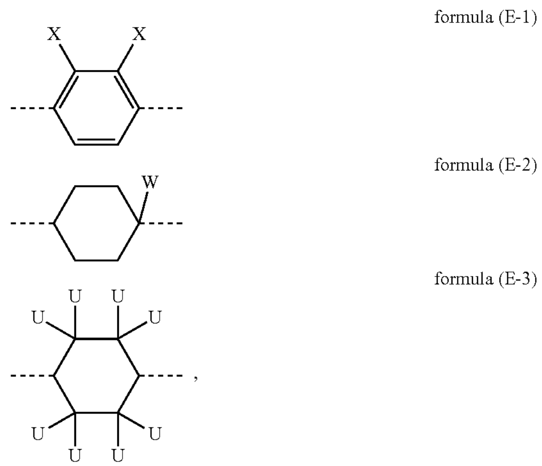

where

X is selected on each occurrence, identically or differently, from F, Cl, Br, I, —CN, —NCO, —NCS, —SCN, —OCN, —NC, —CNO, —CNS and $N_3$;

W is selected on each occurrence, identically or differently, from F, Cl, Br, I, —CN, —NCO, —NCS, —SCN, —OCN, —NC, —CNO, —CNS and $N_3$;

U is selected on each occurrence, identically or differently, from H, F, Cl, Br, I, CN, —NCO, —NCS, —SCN, —OCN, —NC, —CNO, —CNS, $N_3$, and an alkyl, alkoxy or alkylthio group having 1 to 10 C atoms, where one or more hydrogen atoms in the alkyl, alkoxy or alkylthio group may be replaced by F or Cl, and where one or more $CH_2$ groups in the alkyl, alkoxy or alkylthio group may be replaced by O or S;

dashed lines symbolise bonds to the remainder of the compound, and at least one group U per unit of the formula (E-3) is selected from F, Cl, Br, I, CN, —NCO, —NCS, —SCN, —OCN, —NC, —CNO, —CNS and $N_3$.

X is preferably selected on each occurrence, identically or differently, from F and —CN.

W is preferably equal to —CN.

Preferably, at most four groups U per unit of the formula (E-3) are selected from F, Cl, Br, I, CN, —NCO, —NCS, —SCN, —OCN, —NC, —CNO, —CNS and $N_3$, particularly preferably at most two. Very particularly preferably, precisely one group U per unit of the formula (E-3) is selected from F, Cl, Br, I, CN, —NCO, —NCS, —SCN, —OCN, —NC, —CNO, —CNS and $N_3$. Furthermore and preferably in combination with this preferred embodiment, the remaining groups U in the unit of the formula (E-3) are equal to H.

U is preferably selected on each occurrence, identically or differently, from H, F and CN.

Furthermore, the compound V preferably contains at least one unit of the formula (E-1), particularly preferably precisely one unit of the formula (E-1).

The compound V preferably contains at least one unit of the formula (E-2), particularly preferably precisely one unit of the formula (E-2).

Furthermore, the compound V preferably contains precisely one unit selected from units of the formulae (E-1), (E-2) and (E-3). The compound V particularly preferably contains precisely one unit selected from units of the formulae (E-1) and (E-2).

Preferred embodiments of the unit of the formula (E-1) are the units of the formulae (E-1-1) to (E-1-3) shown below:

formula (E-1-1)

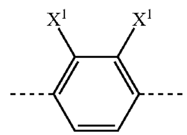

formula (E-1-2)

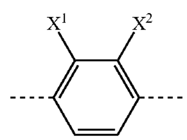

formula (E-1-3)

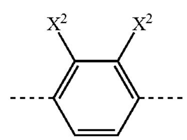

where the dashed lines denote bonds to the remainder of the compound and furthermore:

$X^1$ is selected on each occurrence, identically or differently, from F, Cl, Br and I; and $X^2$ is selected on each occurrence, identically or differently, from —CN, —NCO, —NCS, —SCN, —OCN, —NC, —CNO, —CNS and $N_3$.

$X^1$ is preferably equal to F.

$X^2$ is preferably equal to CN.

Particularly preferred embodiments of the unit of the formula (E-1) are the units of the formulae (E-1-1a) to (E-1-3a) shown below:

formula (E-1-1a)

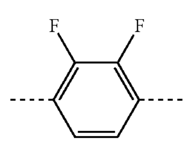

formula (E-1-2a)

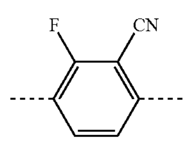

-continued formula (E-1-3a)

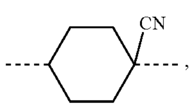

where the dashed lines denote bonds to the remainder of the compound.

A preferred embodiment of the unit of the formula (E-2) is the following unit of the formula (E-2-1):

formula (E-2-1)

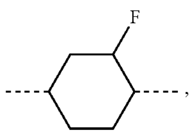

where the dashed lines denote bonds to the remainder of the compound.

A preferred embodiment of the unit of the formula (E-3) is the following unit of the formula (E-3-1):

formula (E-3-1)

F where the dashed lines denote bonds to the remainder of the compound.

The compound V preferably has a structure of the following formula:

formula (V)

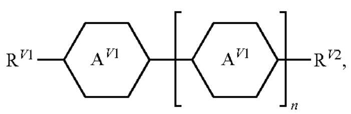

where $R^{V1}$, $R^{V2}$ represent on each occurrence, identically or differently, an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more $CH_2$ groups may be replaced by O or S;

$A^{V1}$ is selected on each occurrence, identically or differently, from the following groups:

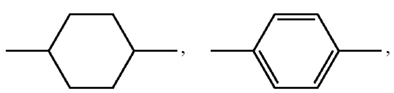

-continued

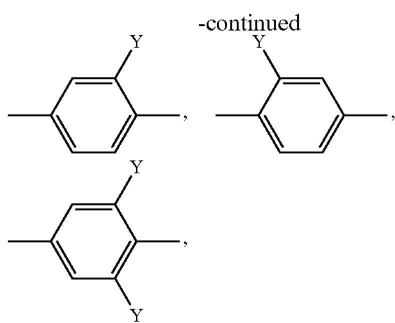

or units of the formula (E-1), (E-2) or (E-3);

Y is selected on each occurrence, identically or differently, from F, Cl, CN, and alkyl, alkoxy or alkylthio groups having 1 to 10 C atoms, where one or more hydrogen atoms in the alkyl, alkoxy or alkylthio groups may be replaced by F or Cl, and where one or more $CH_2$ groups in the alkyl, alkoxy or alkylthio groups may be replaced by O or S;

n is equal to 1, 2 or 3; and where at least one of the groups

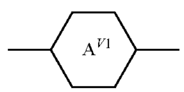

is selected from units of the formula (E-1), (E-2) or (E-3).

The units of the formula (E-1) or (E-2) or (E-3) here are preferably in their preferred embodiments, in particular in the embodiments corresponding to formulae (E-1-1a), (E-1-2a), (E-1-3a), (E-2-1) and (E-3-1).

The compound of the formula (V) preferably contains precisely one unit selected from units of the formulae (E-1), (E-2) and (E-3), particularly preferably precisely one unit selected from units of the formulae (E-1) and (E-2).

The index in formula (V) n is preferably equal to 1 or 2.

Rings

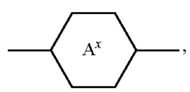

for example $A^{V1}$, are abbreviated to "$A^x$", for example "$A^{V1}$", in the present application in order to improve legibility in running text.

$A^{V1}$ is preferably selected on each occurrence, identically or differently, from

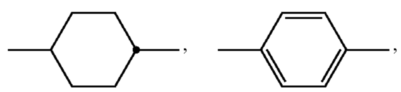

and units of the formulae (E-1-1a), (E-1-2a), (E-1-3a), (E-2-1) and (E-3-1).

Preferred embodiments of the compound V conform to the following formulae (V-1) to (V-8):

formula (V-1)

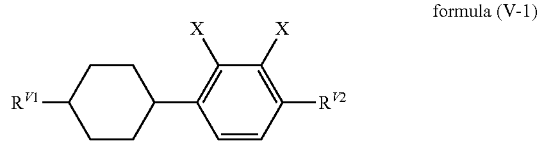

formula (V-2)

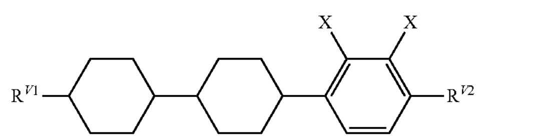

formula (V-3)

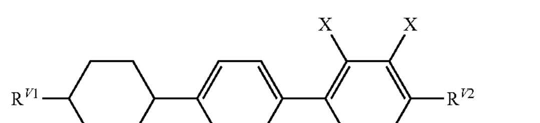

formula (V-4)

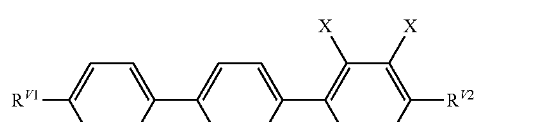
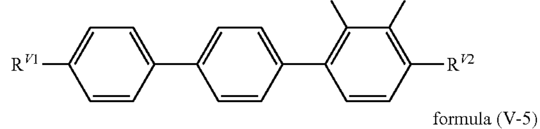

formula (V-5)

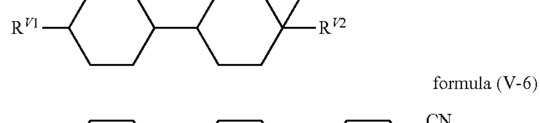

formula (V-6)

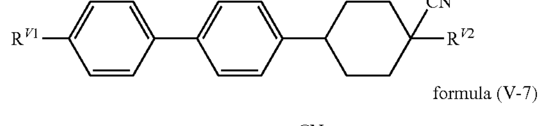

formula (V-7)

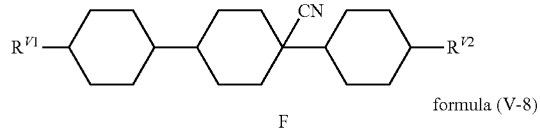

formula (V-8)

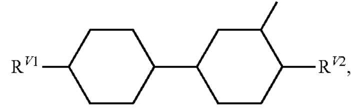

where $R^{V1}$ and $R^{V2}$ and X are defined as indicated above.

For compounds of the formulae (V-1) to (V-8), the groups $R^{V1}$ and $R^{V2}$ are preferably selected on each occurrence, identically or differently, from alkyl or alkoxy groups having 1 to 10 C atoms.

For compounds of the formulae (V-1) to (V-4), the group X is preferably selected on each occurrence, identically or differently, from F and CN. It is particularly preferably equal to F.

The liquid-crystalline material preferably has a clearing point of at least 100° C., particularly preferably a clearing point of at least 105° C.

Furthermore, the liquid-crystalline material is preferably nematically liquid-crystalline at least in a temperature range from −20° C. to 100° C., particularly preferably at least in a temperature range from −30° C. to 100° C., very particularly preferably at least in a temperature range from −40° C. to 105° C. and most preferably at least in a temperature range from −50° C. to 105° C.

Furthermore, the liquid-crystalline material preferably has a dielectric anisotropy Δε of −2 to −10, preferably −3 to −8, particularly preferably −4 to −7. Measurement methods for the dielectric anisotropy are indicated in the working examples.

Furthermore, the liquid-crystalline material preferably has an optical anisotropy Δn of 0.01 to 0.3, particularly preferably 0.03 to 0.20. Measurement methods for the optical anisotropy are indicated in the working examples.

Furthermore, the liquid-crystalline material is preferably a mixture of various organic compounds, which themselves preferably have liquid-crystalline properties. The liquid-crystalline material particularly preferably comprises 8 to 30 different organic compounds, very particularly preferably 10 to 25 different organic compounds.

The said organic compounds preferably have an elongate shape, i.e. they have a significantly greater extension in one of the three spatial directions than in the two other spatial directions.

A multiplicity of organic compounds which have these properties is known to the person skilled in the art. Particularly preferred constituents of the liquid-crystalline material in accordance with the present application are organic compounds which result from para-linking of two or more, preferably two, three or four, six-membered rings, in particular cyclohexane rings, cyclohexene rings, benzene rings, pyridine rings, pyrimidine rings and tetrahydropyran rings.

The compound V is preferably a compound like the organic compound described above. The liquid-crystalline material preferably comprises one to twenty compounds V, each having a different structure, particularly preferably 5 to 15 compounds V, each having a different structure.

The liquid-crystalline material preferably comprises one or more compounds of the following formula (F):

formula (F)

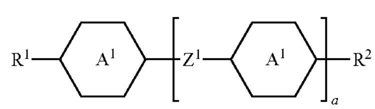

where $R^1$, $R^2$ represent on each occurrence, identically or differently, F, Cl, —CN, —NCS, —SCN, $R^3$—O—CO—, $R^3$—CO—O— or an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more $CH_2$ groups may be replaced by O or S; and $R^3$ represents on each occurrence, identically or differently, an alkyl group having 1 to 10 C atoms, in which one or more hydrogen atoms may be replaced by F or Cl, and in which one or more $CH_2$ groups may be replaced by O or S; and $A^1$ is selected on each occurrence, identically or differently, from one of the following groups:

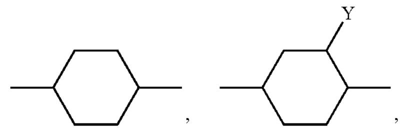

-continued

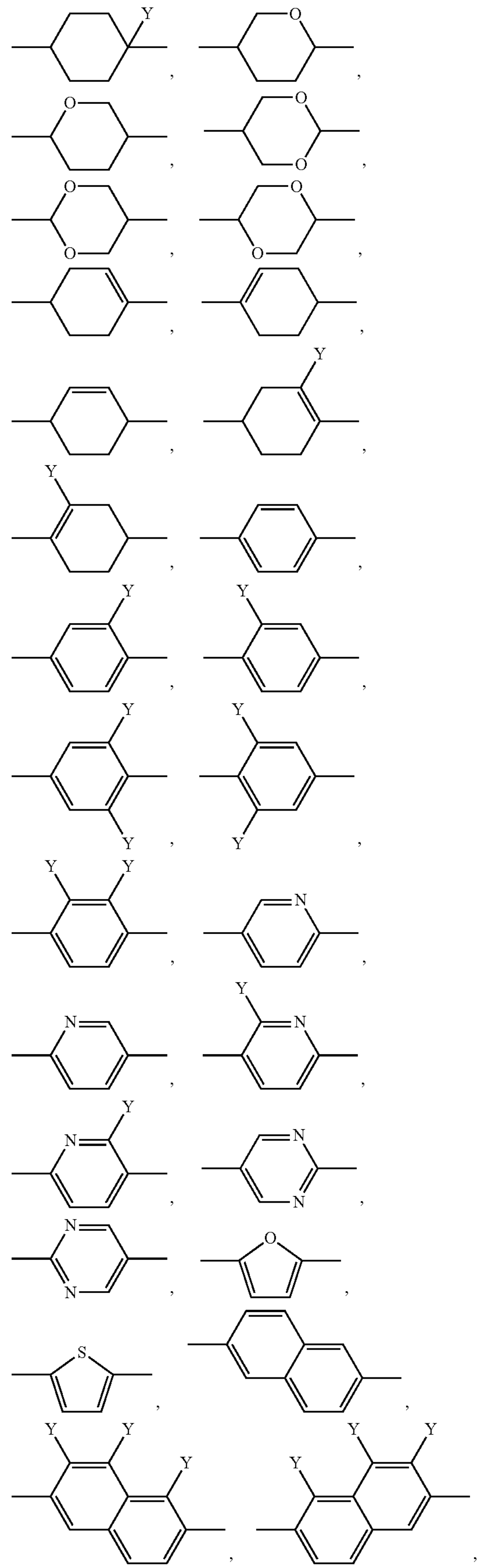

-continued

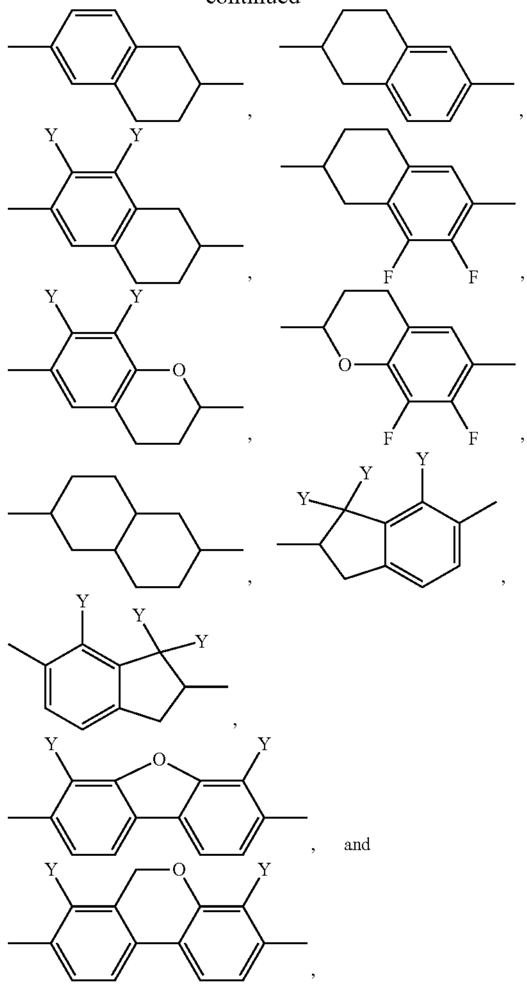

where

Y is selected on each occurrence, identically or differently, from F, Cl, CN, and alkyl, alkoxy or alkylthio groups having 1 to 10 C atoms, where one or more hydrogen atoms in the alkyl, alkoxy or alkylthio groups may be replaced by F or Cl, and where one or more $CH_2$ groups in the alkyl, alkoxy or alkylthio groups may be replaced by O or S; and $Z^1$ is selected on each occurrence, identically or differently, from —CO—O—, —O—CO—, —$CF_2$—$CF_2$—, —$CF_2$—O—, —O—$CF_2$—, —$CH_2$—$CH_2$—, —CH═CH—, —CF═CF—, —CF═CH—, —CH═CF—, —C≡C—, —$OCH_2$—, —$CH_2O$— and a single bond; and a has a value of 0, 1, 2, 3, 4, 5 or 6, preferably 0, 1, 2 or 3, particularly preferably 1, 2 or 3.

The liquid-crystalline material preferably comprises no compounds containing siloxane groups, particularly preferably no compounds containing silicon.

Furthermore, the liquid-crystalline material preferably has a total proportion of compounds V of at least 40% by weight, particularly preferably at least 50% by weight, very particularly preferably at least 60% by weight and most preferably at least 70% by weight.

Furthermore, the liquid-crystalline material preferably comprises one or more compounds which conform to the formula (F-1), $$R^{11}-\left(A^{11}\right)-Z^{11}-\left(A^{11}\right)-Z^{11}-\left(A^{11}\right)-Z^{11}-\left(A^{11}\right)-R^{12} \quad \text{(F-1)}$$

where $R^{11}$, $R^{12}$ represent on each occurrence, identically or differently, F, Cl, —CN, —NCS, —SCN, $R^3$—O—CO—, $R^3$—CO—O— or an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more $CH_2$ groups may be replaced by O or S; and $R^3$ represents on each occurrence, identically or differently, an alkyl group having 1 to 10 C atoms, in which one or more hydrogen atoms may be replaced by F or Cl, and in which one or more $CH_2$ groups may be replaced by O or S;

$Z^{11}$ is selected on each occurrence, identically or differently, from —CO—O—, —O—CO—, —$CF_2$—$CF_2$—, —$CF_2$—O—, —O—$CF_2$—, —$CH_2$—$CH_2$—, —CH═CH—, —CF═CF—, —CF═CH—, —CH═CF—, —C≡C—, —$OCH_2$—, —$CH_2O$— and a single bond; and $A^{11}$ is selected on each occurrence, identically or differently, from the following groups:

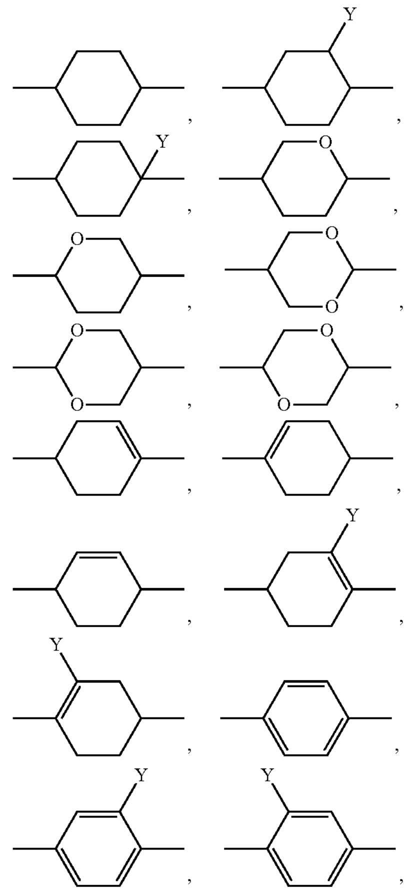

-continued

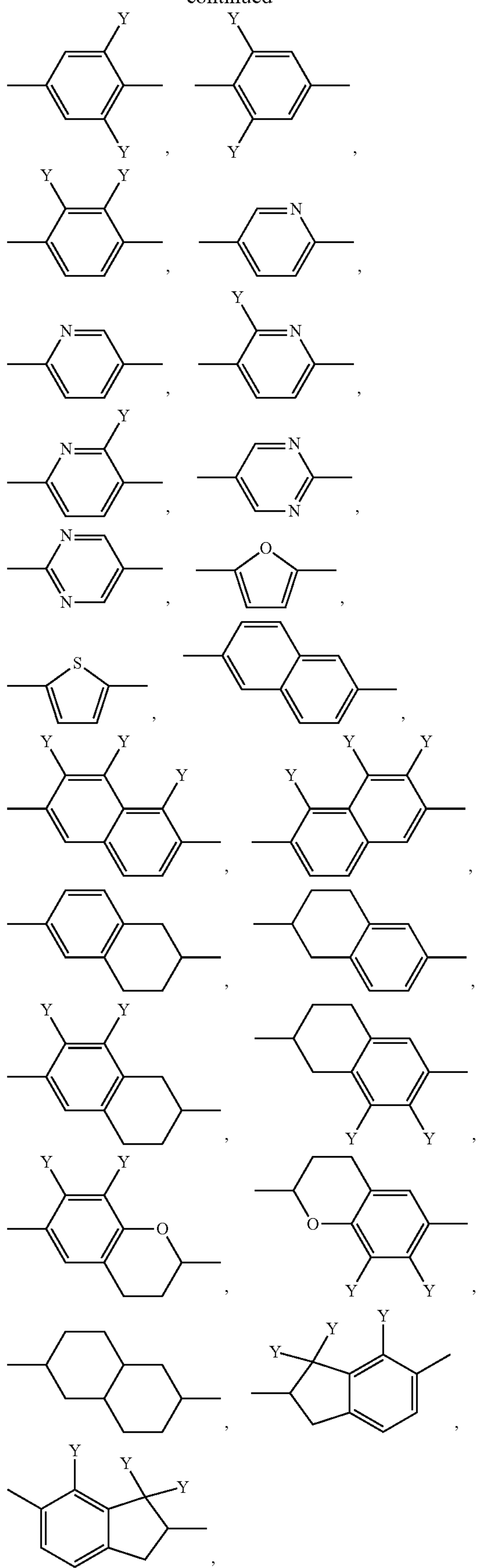

-continued

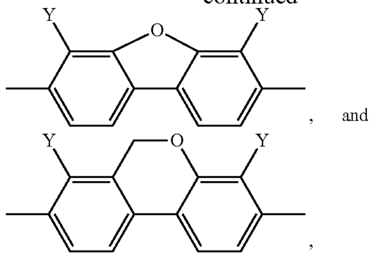

where

Y is selected on each occurrence, identically or differently, from F, Cl, CN, and alkyl, alkoxy or alkylthio groups having 1 to 10 C atoms, where one or more hydrogen atoms in the alkyl, alkoxy or alkylthio groups may be replaced by F or Cl, and where one or more $CH_2$ groups in the alkyl, alkoxy or alkylthio groups may be replaced by O or S.

$R^{11}$, $R^{12}$ are preferably on each occurrence, identically or differently, alkyl groups having 1 to 10 C atoms.

$Z^{11}$ is preferably selected on each occurrence, identically or differently, from —CO—O—, —O—CO— and a single bond.

$A^{11}$ is preferably selected on each occurrence, identically or differently, from

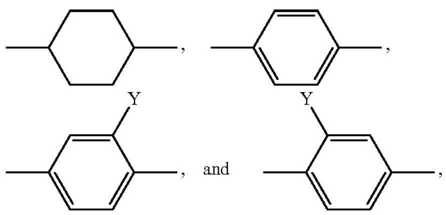

where

Y is defined as above and is preferably equal to F or CN.

Particularly preferred compounds of the formula (F-1) conform to the following formulae:

formula (F-1-1)

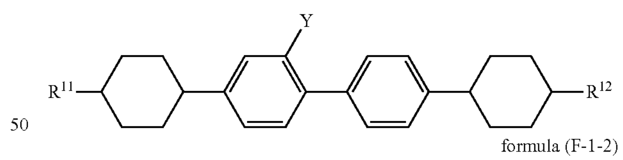

formula (F-1-2)

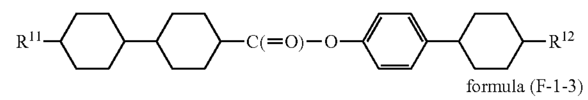

formula (F-1-3)

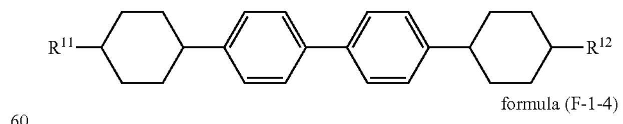

formula (F-1-4)

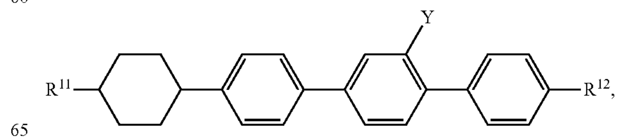

where Y is defined as above and is preferably equal to F.

The liquid-crystalline material preferably comprises compound(s) of the formula (F-1) in a total proportion of 0% by weight to 30% by weight, particularly preferably 5% by weight to 25% by weight and very particularly preferably 10% by weight to 20% by weight.

The liquid-crystalline material preferably comprises at least one compound V which contains a unit of the formula (E-2), and at least one compound of the formula (F-1). The liquid-crystalline material preferably comprises compounds selected from compounds V which contains at least one unit of the formula (E-2), and compound(s) of the formula (F-1) in a total proportion of at least 10% by weight, particularly preferably at least 20% by weight, very particularly preferably at least 30% by weight, more preferably at least 40% by weight and most preferably at least 50% by weight.

Furthermore, the liquid-crystalline material preferably comprises one or more compounds which conform to the formula (F-2), (F-2)

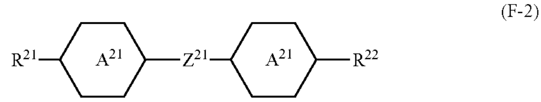

where $R^{21}$ is defined like $R^{11}$ above;

$R^{22}$ is defined like $R^{12}$ above;

$Z^{21}$ is defined like $Z^{11}$ above; and $A^{21}$ is defined like $A^{11}$ above.

$R^{21}$, $R^{22}$ are preferably on each occurrence, identically or differently, alkyl groups having 1 to 10 C atoms or alkoxy groups having 1 to 10 C atoms.

$Z^{21}$ is preferably a single bond.

$A^{1}$ is preferably selected on each occurrence, identically or differently, from

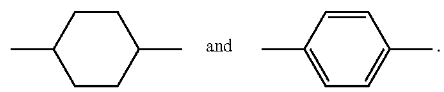

Particularly preferred compounds of the formula (F-2) conform to the following formulae (F-2-1) and (F-2-2):

formula (F-2-1)

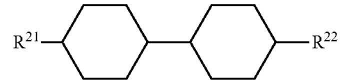

formula (F-2-2)

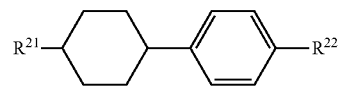

The liquid-crystalline material preferably comprises compound(s) of the formula (F-2) in a total proportion of 0% by weight to 30% by weight, particularly preferably 3% by weight to 20% by weight and very particularly preferably 5% by weight to 15% by weight.

It is preferred in accordance with the invention for the liquid-crystalline material according to the invention to comprise one or more chiral dopants. In this case, the molecules of the liquid-crystalline material are preferably twisted with respect to one another in the layer of the device according to the invention, particularly preferably as known from the TN mode of displays.

According to an alternative, likewise preferred embodiment, the liquid-crystalline material according to the invention comprises no chiral dopants. In this case, the molecules of the liquid-crystalline material are preferably not twisted with respect to one another in the LC device of the guest-host type. In this case, the LC device is particularly preferably in the antiparallel mode.

Chiral dopants are preferably used in the liquid-crystalline material according to the invention in a total concentration of 0.01% by weight to 3% by weight, particularly preferably 0.05% by weight to 1% by weight. In order to obtain high values for the twist, the total concentration of the chiral dopants may also be selected higher than 3% by weight preferably up to a maximum of 10% by weight.

The proportions of these compounds and other components present in minor amounts are neglected when specifying the proportions of the liquid-crystalline compounds and the dye compounds.

Preferred dopants are the compounds depicted in the following table:

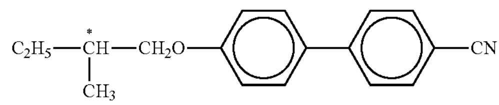

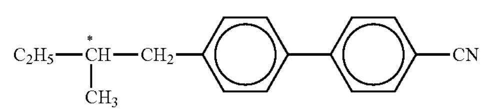

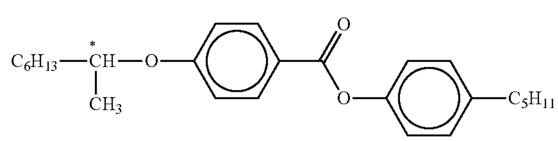

-continued
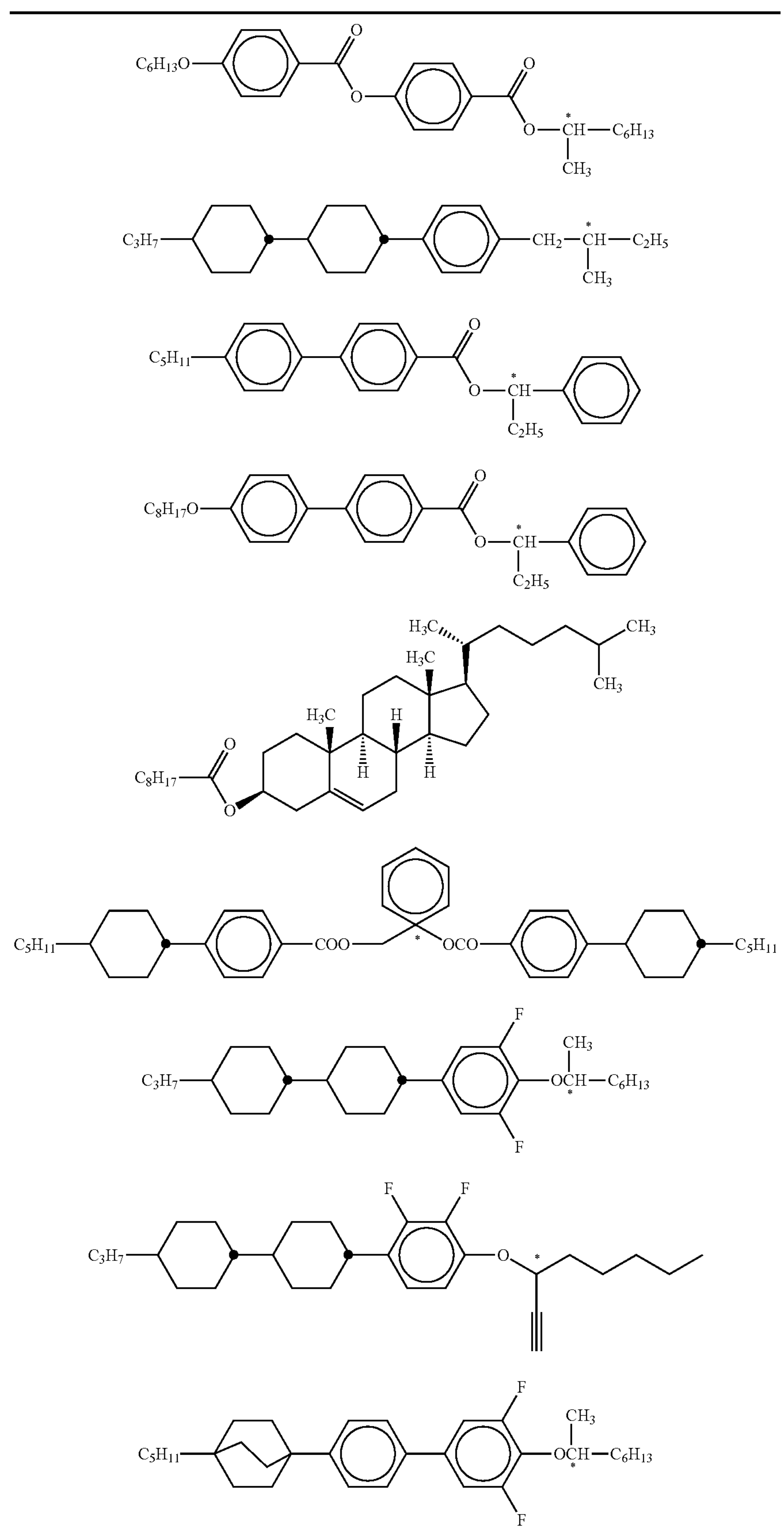

-continued

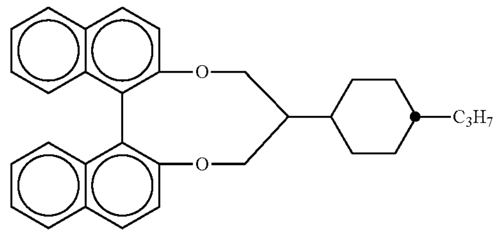

The liquid-crystalline material according to the invention furthermore preferably comprises one or more stabilisers. The total concentration of the stabilisers is preferably between 0.00001% by weight and 10% by weight, particularly preferably between 0.0001% by weight and 1% by weight of the mixture as a whole.

Preferred stabilisers are shown in the following table:

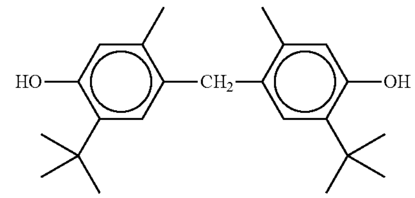

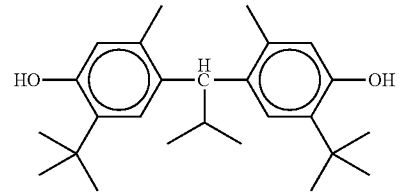

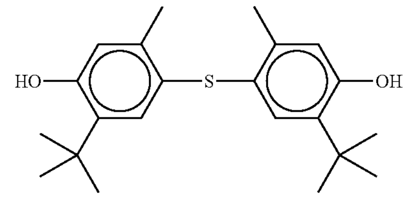

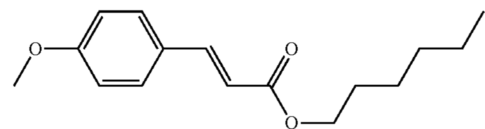 [SMILES: CCCCCCOC(=O)/C=C/c1ccc(OC)cc1]

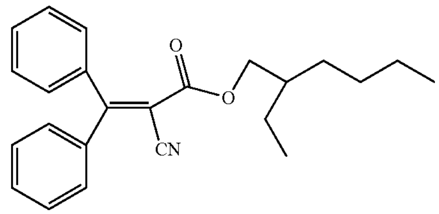 [SMILES: CCCCC(CC)COC(=O)C(C#N)=C(c1ccccc1)c1ccccc1]

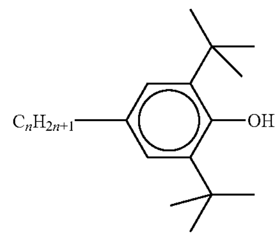

-continued
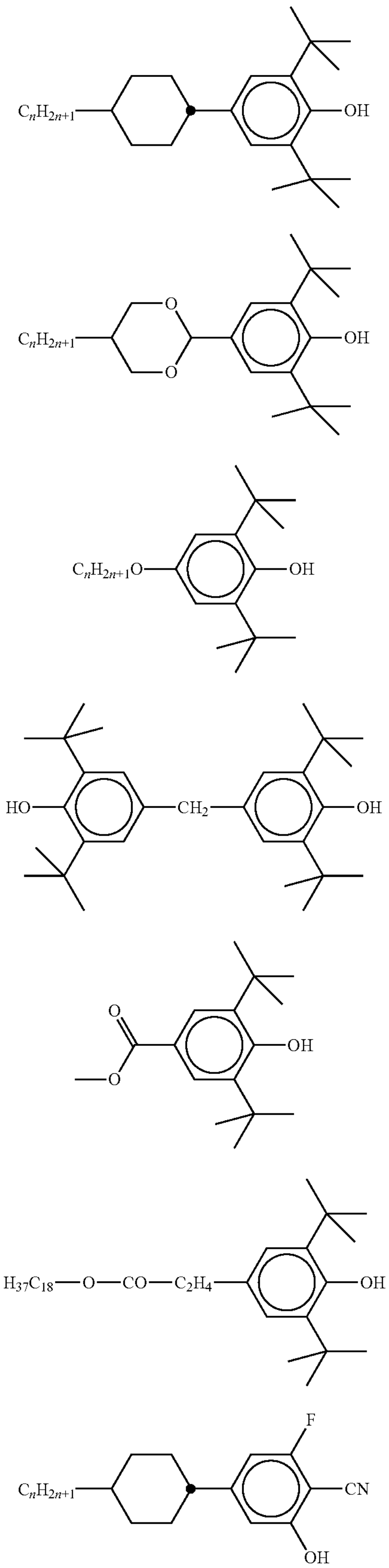

-continued
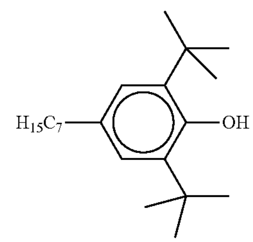
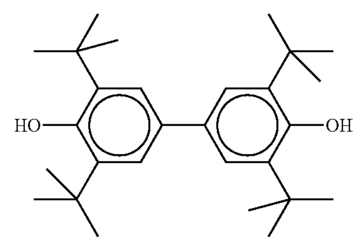
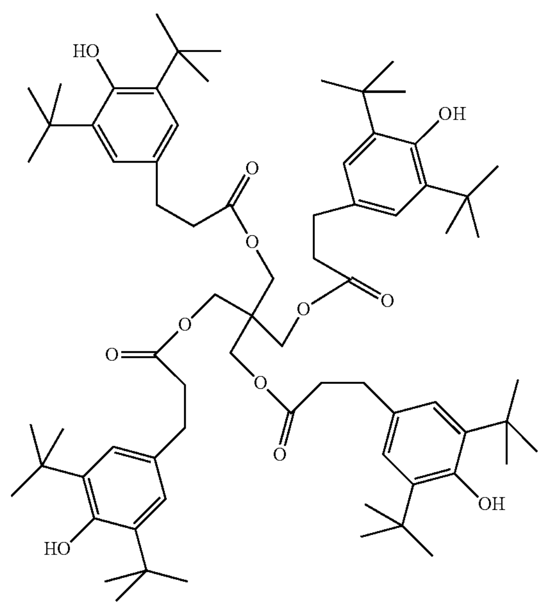 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
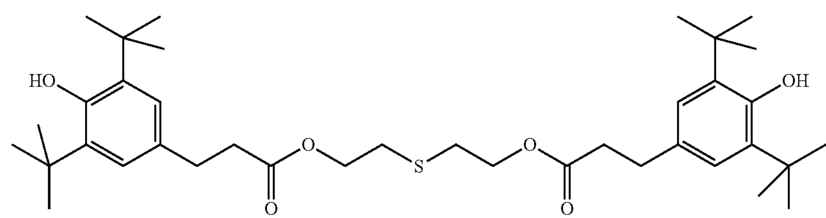 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

-continued
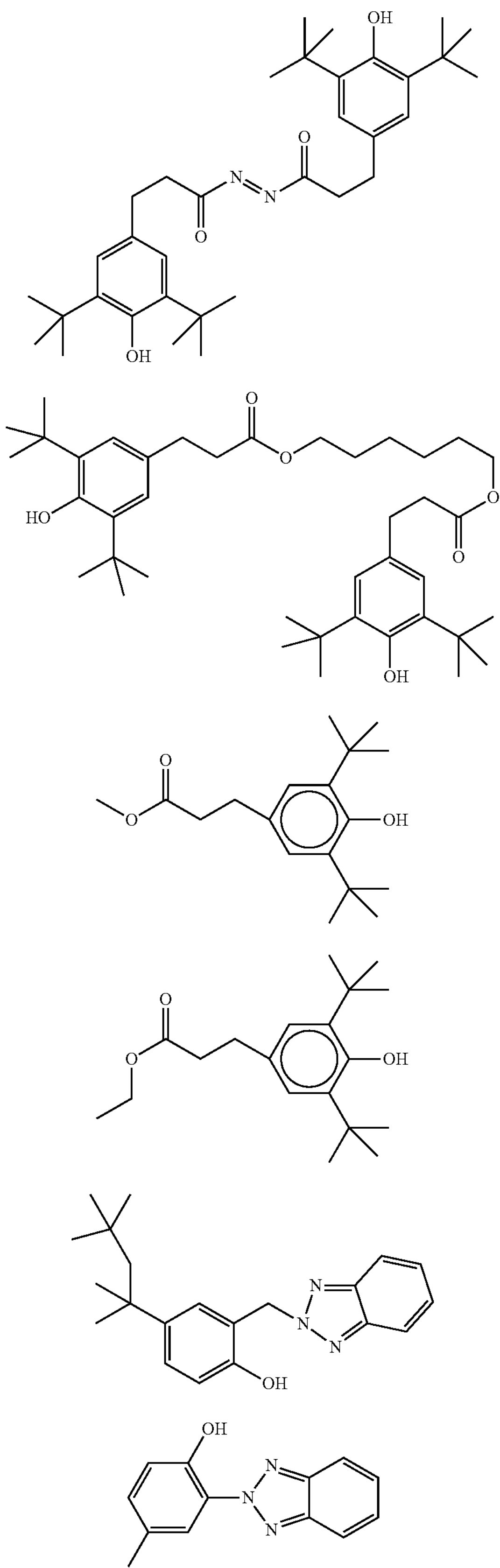

-continued
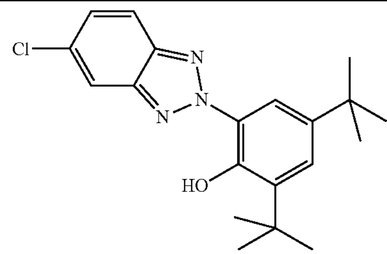
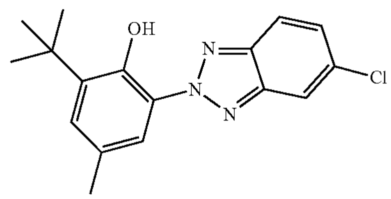 [SMILES: Cc1cc(-n2nc3ccc(Cl)cc3n2)c(O)c(C(C)(C)C)c1]
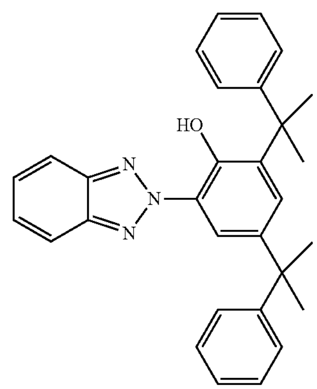 [SMILES: CC(C)(c1ccccc1)c1cc(-n2nc3ccccc3n2)c(O)c(C(C)(C)c2ccccc2)c1]
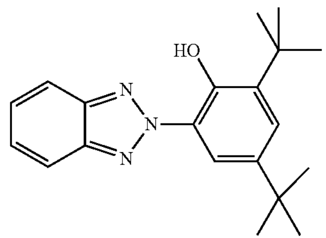 [SMILES: CC(C)(C)c1cc(-n2nc3ccccc3n2)c(O)c(C(C)(C)C)c1]
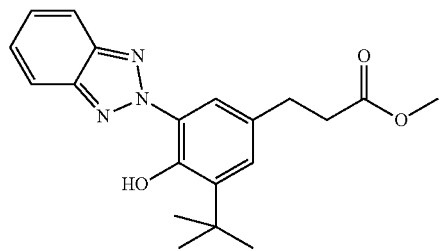 [SMILES: COC(=O)CCc1cc(-n2nc3ccccc3n2)c(O)c(C(C)(C)C)c1]
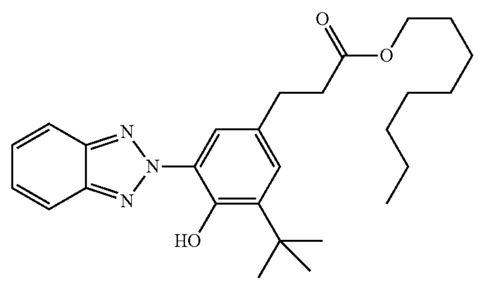 [SMILES: CCCCCCCCOC(=O)CCc1cc(-n2nc3ccccc3n2)c(O)c(C(C)(C)C)c1]

-continued
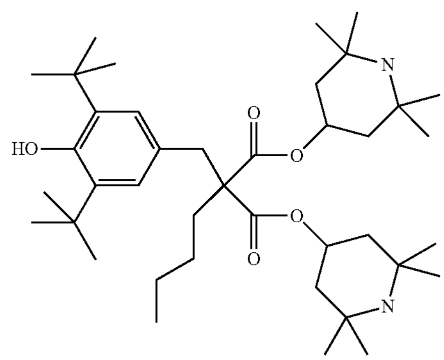 [SMILES: CCCCC(Cc1cc(C(C)(C)C)c(O)c(C(C)(C)C)c1)(C(=O)OC1CC(C)(C)NC(C)(C)C1)C(=O)OC1CC(C)(C)NC(C)(C)C1]
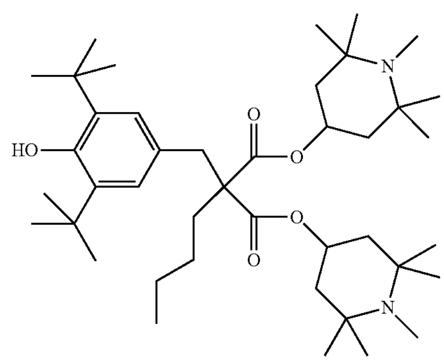 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]
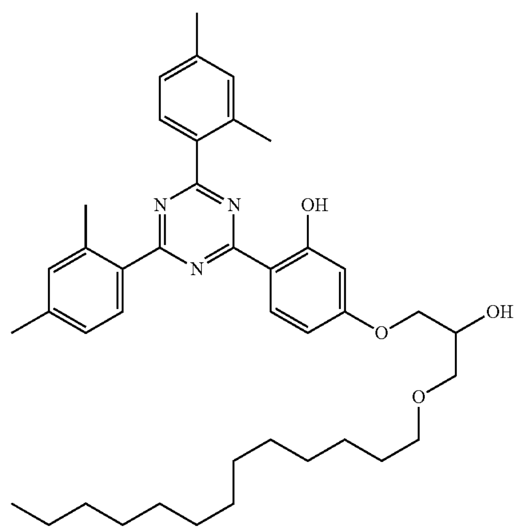 [SMILES: CCCCCCCCCCCCCOCC(O)COc1ccc(-c2nc(-c3ccc(C)cc3C)nc(-c3ccc(C)cc3C)n2)c(O)c1]

-continued
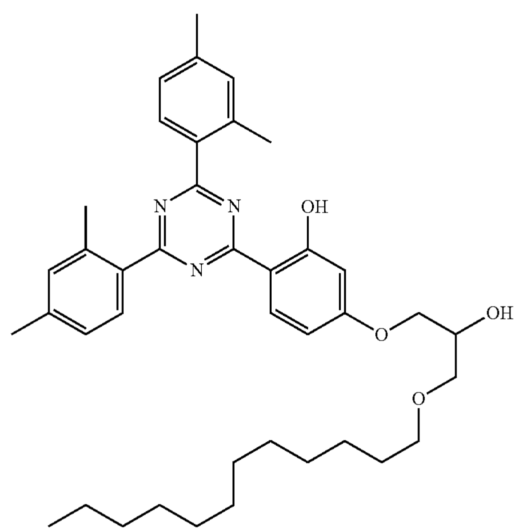 [SMILES: CCCCCCCCCCCCOCC(O)COc1ccc(-c2nc(-c3ccc(C)cc3C)nc(-c3ccc(C)cc3C)n2)c(O)c1]
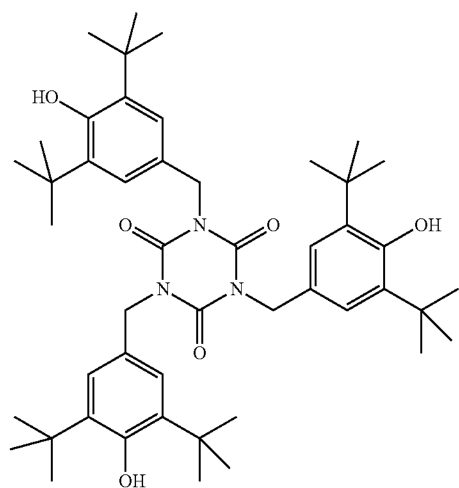 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
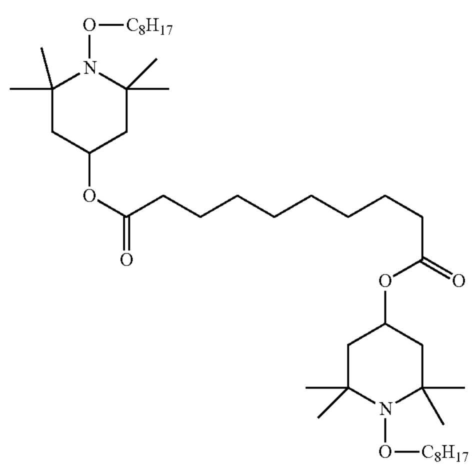

-continued
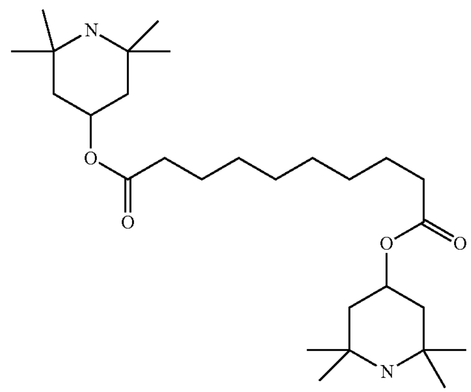
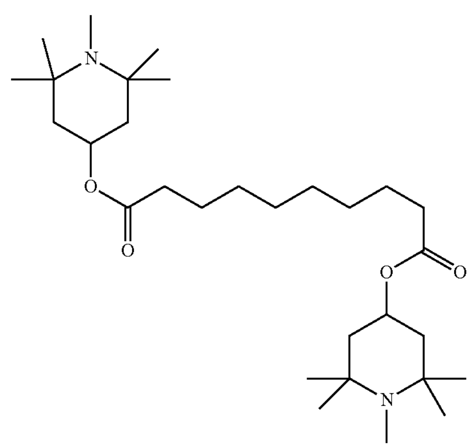
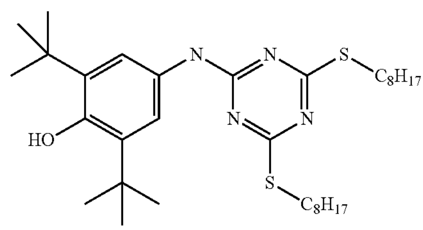
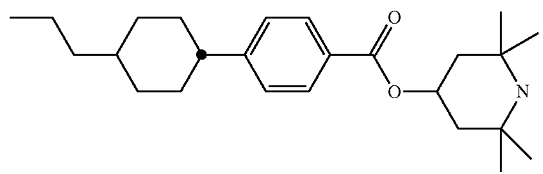

-continued
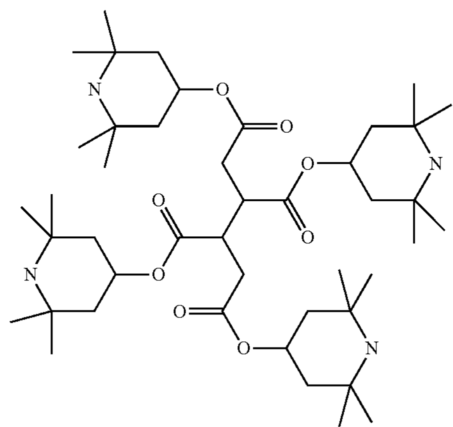
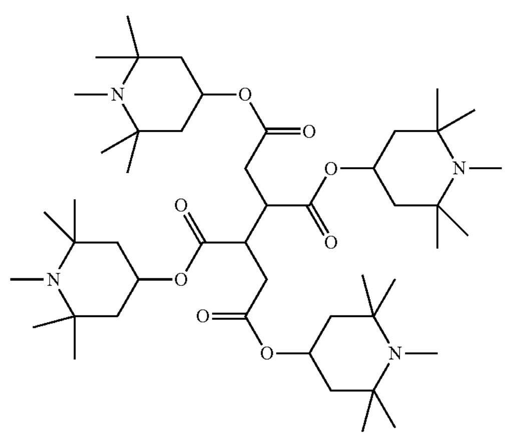
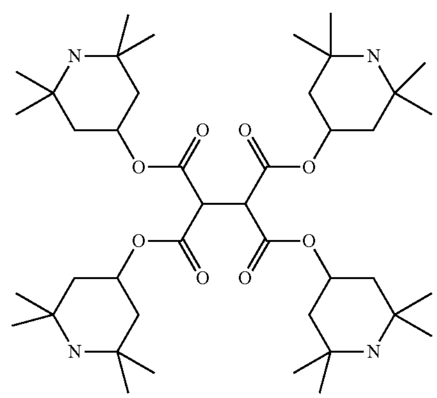

-continued

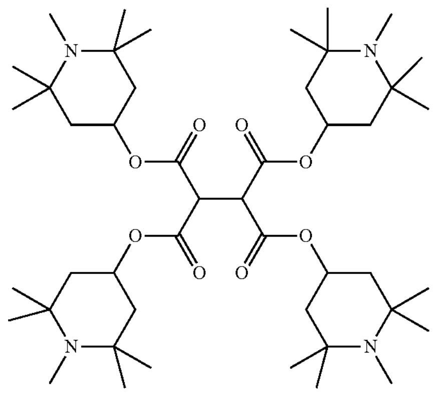

The liquid-crystalline material according to the invention comprises one or more dye compounds. The dye compounds are preferably organic compounds, particularly preferably organic compounds containing at least one condensed aryl or heteroaryl group.

The liquid-crystalline material according to the invention preferably comprises at least two, particularly preferably at least three and very particularly preferably three or four different dye compounds. The at least two dye compounds preferably each cover different regions of the light spectrum.

If two or more dye compounds are present in the liquid-crystalline material according to the invention, the absorption spectra of the dye compounds preferably complement one another in such a way that essentially the entire visible spectrum of light is absorbed. This gives rise to the impression of a black colour for the human eye. This is preferably achieved by three or more dye compounds being used, at least one of which absorbs blue light, at least one of which absorbs green to yellow light and at least one of which absorbs red light. Light colour here is in accordance with B. Bahadur, Liquid Crystals—Applications and Uses, Vol. 3, 1992, World Scientific Publishing, Section 11.2.1. It is pointed out that the perceived colour of the dye compound in each case represents the complementary colour to the absorbed colour, i.e. that a dye compound which absorbs blue light has a yellow colour.

The proportion of the dye compound(s) in the liquid-crystalline material according to the invention is preferably in total 0.01 to 10% by weight, particularly preferably 0.1 to 7% by weight and very particularly preferably 0.2 to 7% by weight. The proportion of an individual dye compound is preferably 0.01 to 10% by weight, particularly preferably 0.05 to 7% by weight and very particularly preferably 0.1 to 7% by weight.

The dye compound present in the liquid-crystalline material is preferably dissolved therein. The dye compound is preferably influenced in its alignment by the alignment of the molecules of the liquid-crystalline material.

Furthermore, the dye compounds are preferably dichroic dye compounds, particularly preferably positively dichroic dye compounds. Positively dichroic is taken to mean that the dye compound has a positive degree of anisotropy R, determined as indicated in the working examples. The degree of anisotropy R is particularly preferably greater than 0.4, very particularly preferably greater than 0.5 and most preferably greater than 0.6.

The absorption of the dye compound preferably reaches a maximum when the polarisation direction of the light is parallel to the direction of the longest elongation of the molecule of the dye compound and reaches a minimum when the polarisation direction of the light is perpendicular to the direction of the longest elongation of the molecule of the dye compound.

The dye compound in accordance with the present application furthermore preferably absorbs predominantly light in the UV-VIS-NIR region, i.e. in a wavelength range from 320 to 2000 nm.

The dye compound is furthermore preferably a fluorescent dye compound. Fluorescence here is taken to mean that a compound is placed in an electronically excited state by absorption of light having a certain wavelength, where the compound subsequently undergoes a transition into the ground state with emission of light. The emitted light preferably has a longer wavelength than the absorbed light. The transition from the excited state to the ground state is furthermore preferably spin-allowed, i.e. takes place without a change in the spin. The lifetime of the excited state of the fluorescent compound is furthermore preferably shorter than $10^{-5}$ s, particularly preferably shorter than $10^{-6}$ s, very particularly preferably between $10^{-9}$ and $10^{-7}$ s.

The dye compound is furthermore preferably selected from the dye classes indicated in B. Bahadur, Liquid Crystals—Applications and Uses, Vol. 3, 1992, World Scientific Publishing, Section 11.2.1 and particularly preferably from the compounds explicitly mentioned in the table.

The dye compound is preferably selected from azo compounds, anthraquinones, methine compounds, azomethine compounds, merocyanine compounds, naphthoquinones, tetrazines, perylenes, terrylenes, quarterrylenes, higher rylenes, benzothiadiazoles, pyrromethenes and diketopyrrolopyrroles. Of these, particular preference is given to perylenes, benzothiadiazoles and diketopyrrolopyrroles.

The said dye compounds have been described many times in the literature. Thus, for example, anthraquinone dyes are described in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described in DE 3126108 and DE 3202761, azo dyes are described in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Lig. Cryst. 39, 39-52 (1977) and H. Seki, C. Shishido, S. Yasui and T. Uchida: Jpn. J.

Appl. Phys. 21, 191-192 (1982), and perylenes are described in EP 60895, EP 68427 and WO 82/1191.

Particular preference is given to anthraquinone dyes, azo dyes and naphthoquinone dyes, as disclosed in detail, for example, in DE 3307238, and rylene dyes, as disclosed, for example, in EP 2166040, US 2011/0042651, EP 68427, EP 47027, EP 60895, DE 3110960 and EP 698649, and benzothiadiazole dyes, as disclosed, for example, in the as yet unpublished application EP13002711.3.

Examples of preferred dye compounds are depicted in the following table:

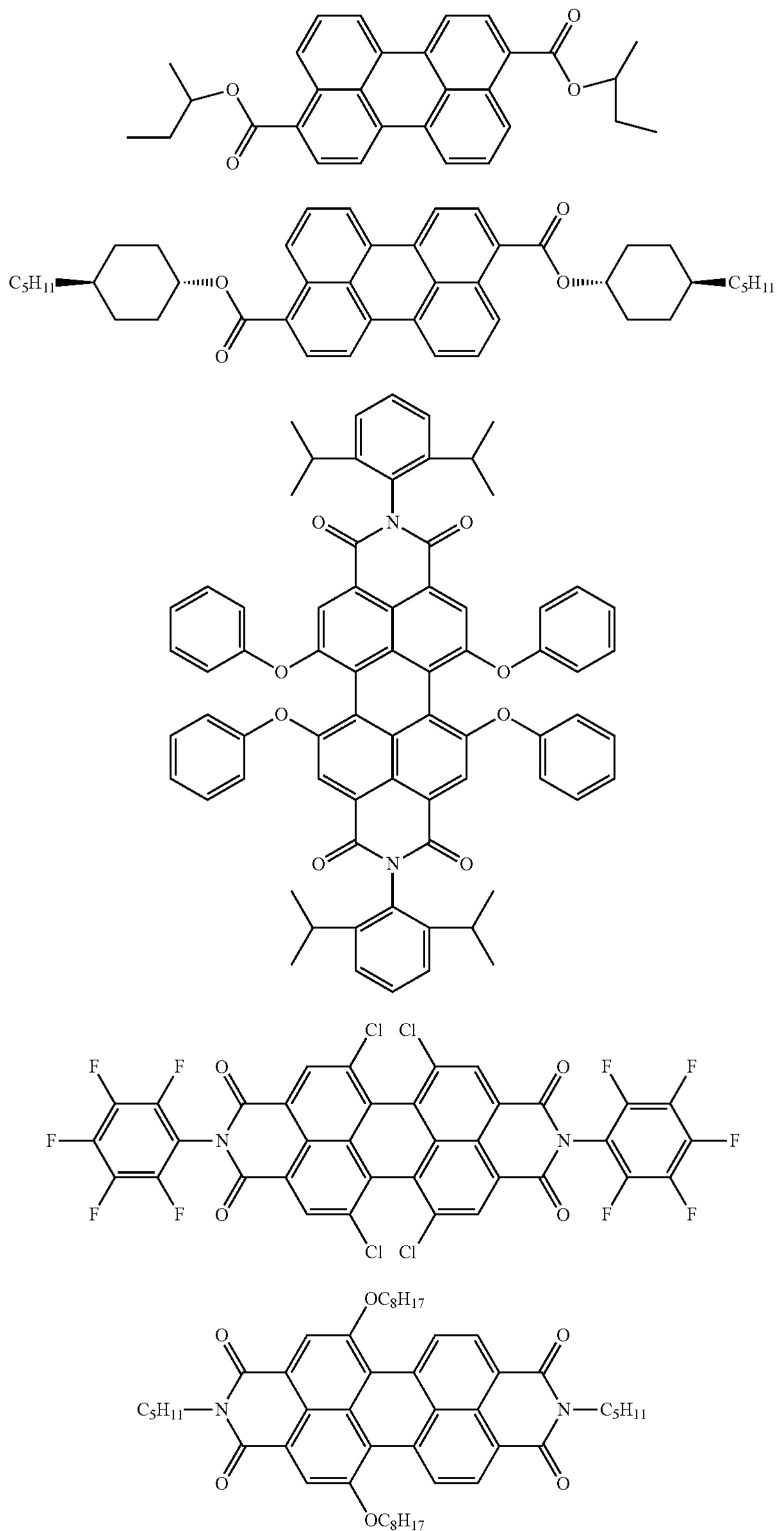

-continued
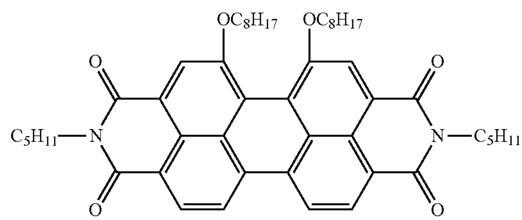
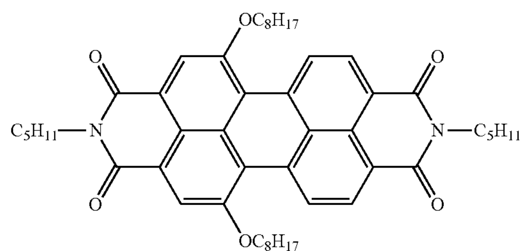
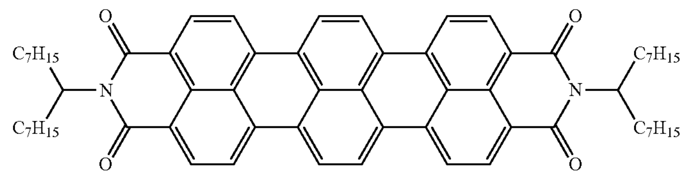
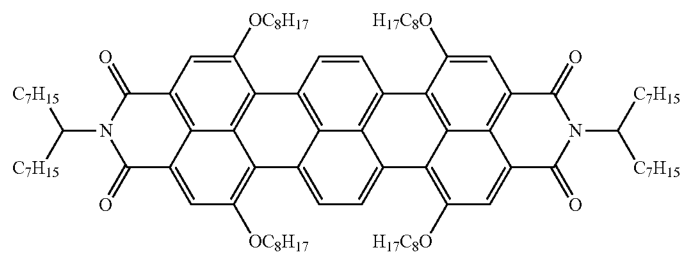
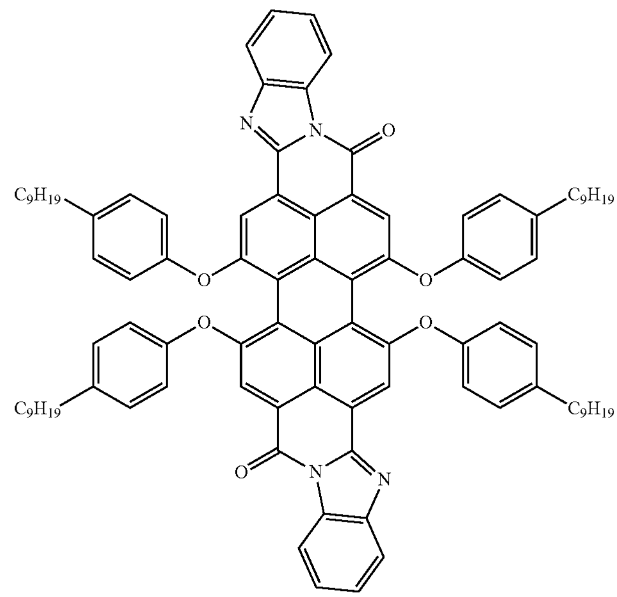

-continued
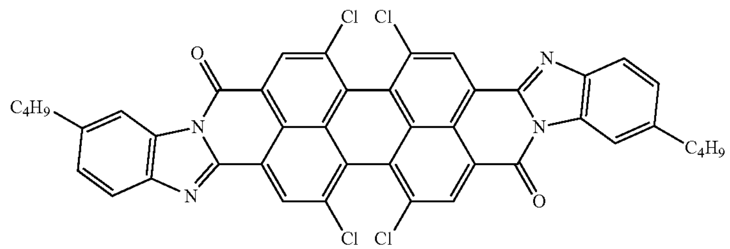
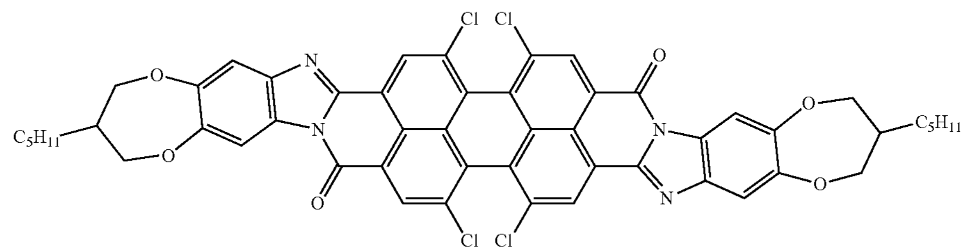
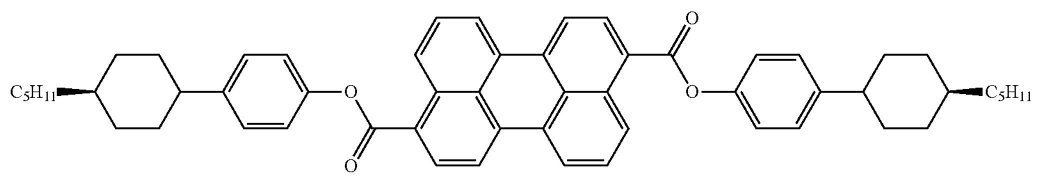
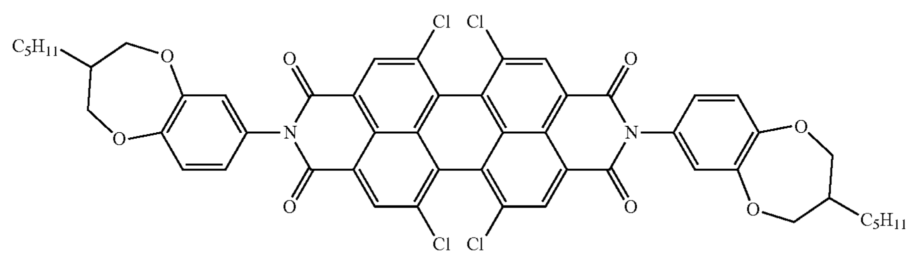
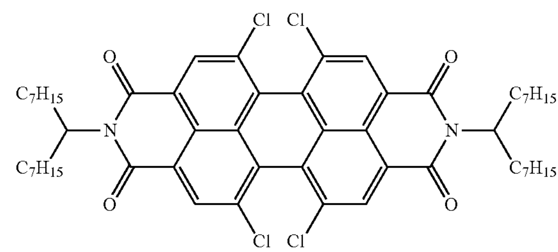
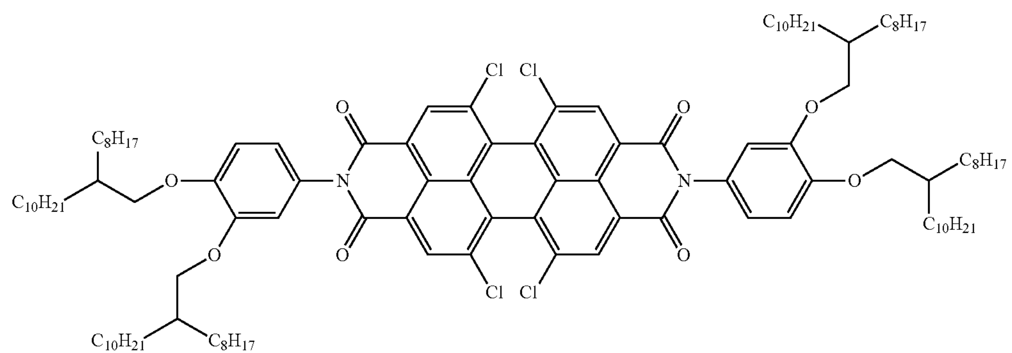

-continued
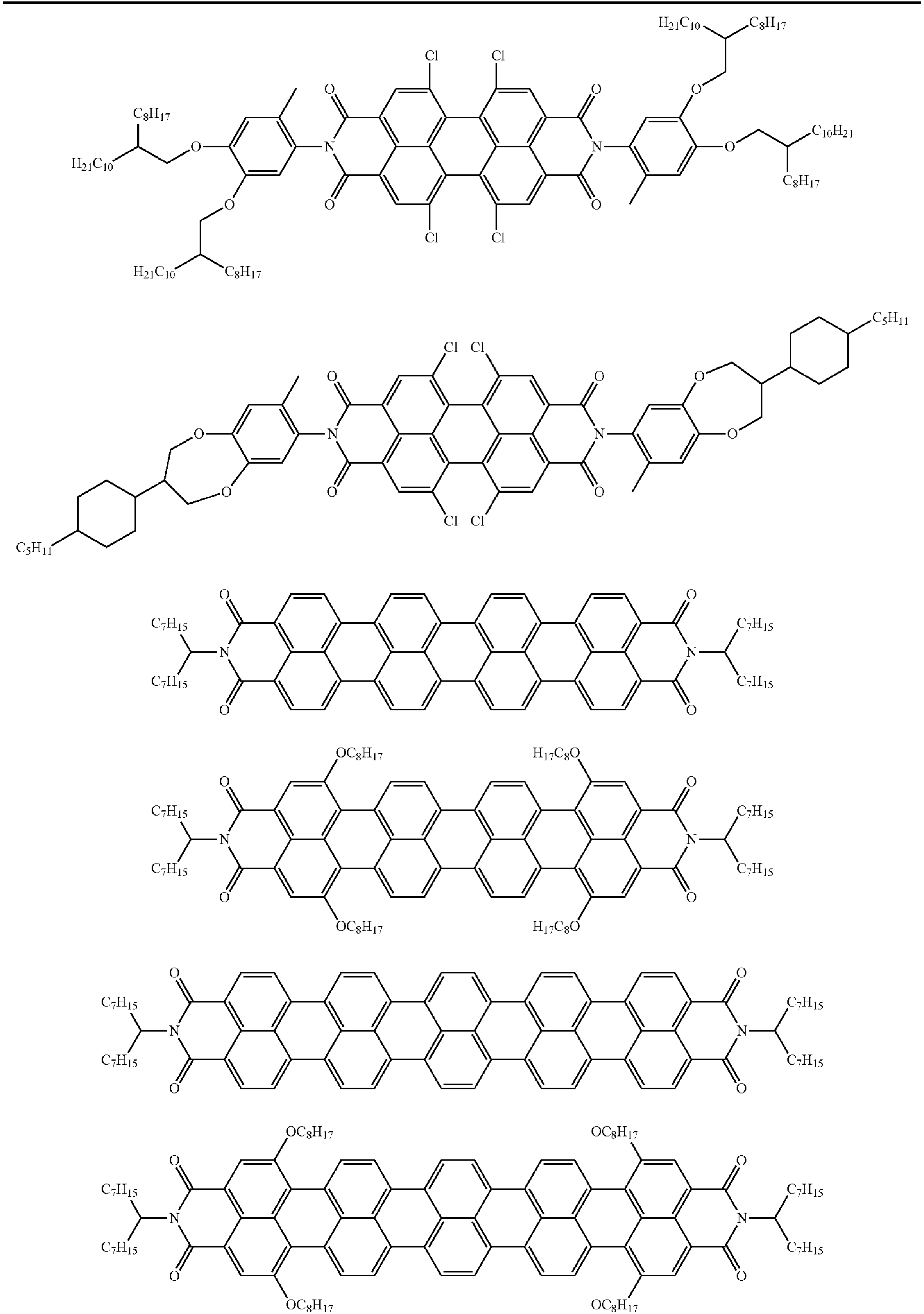

-continued
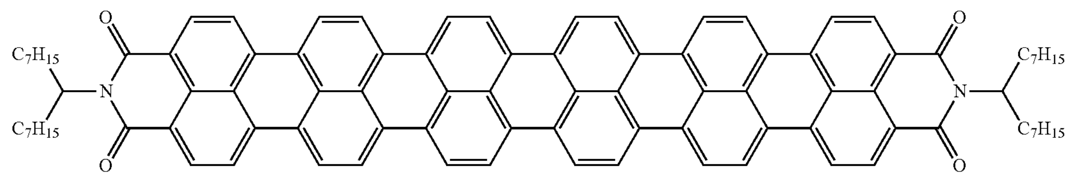
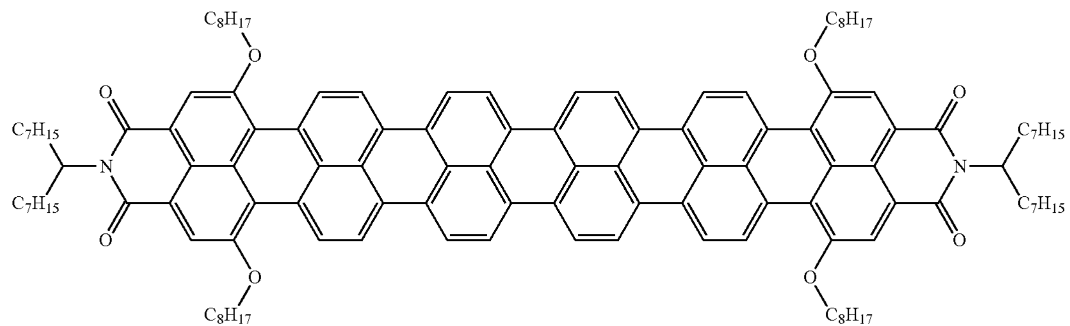
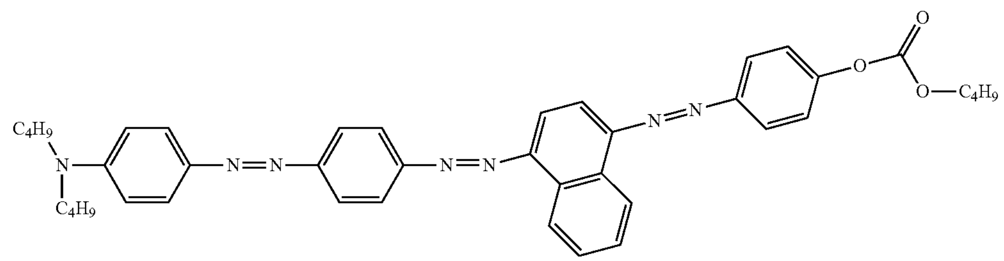
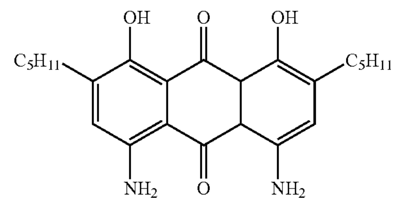
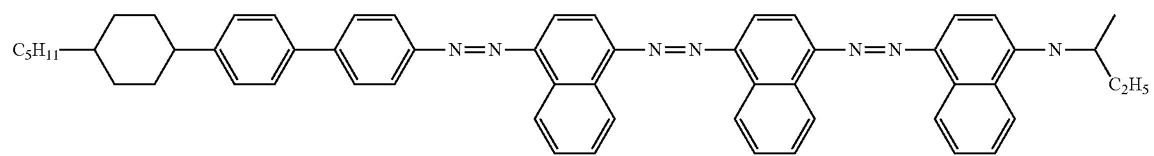
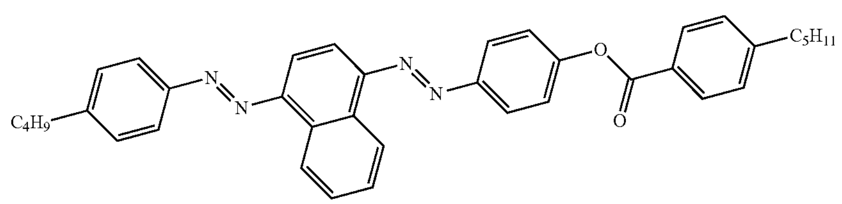

-continued
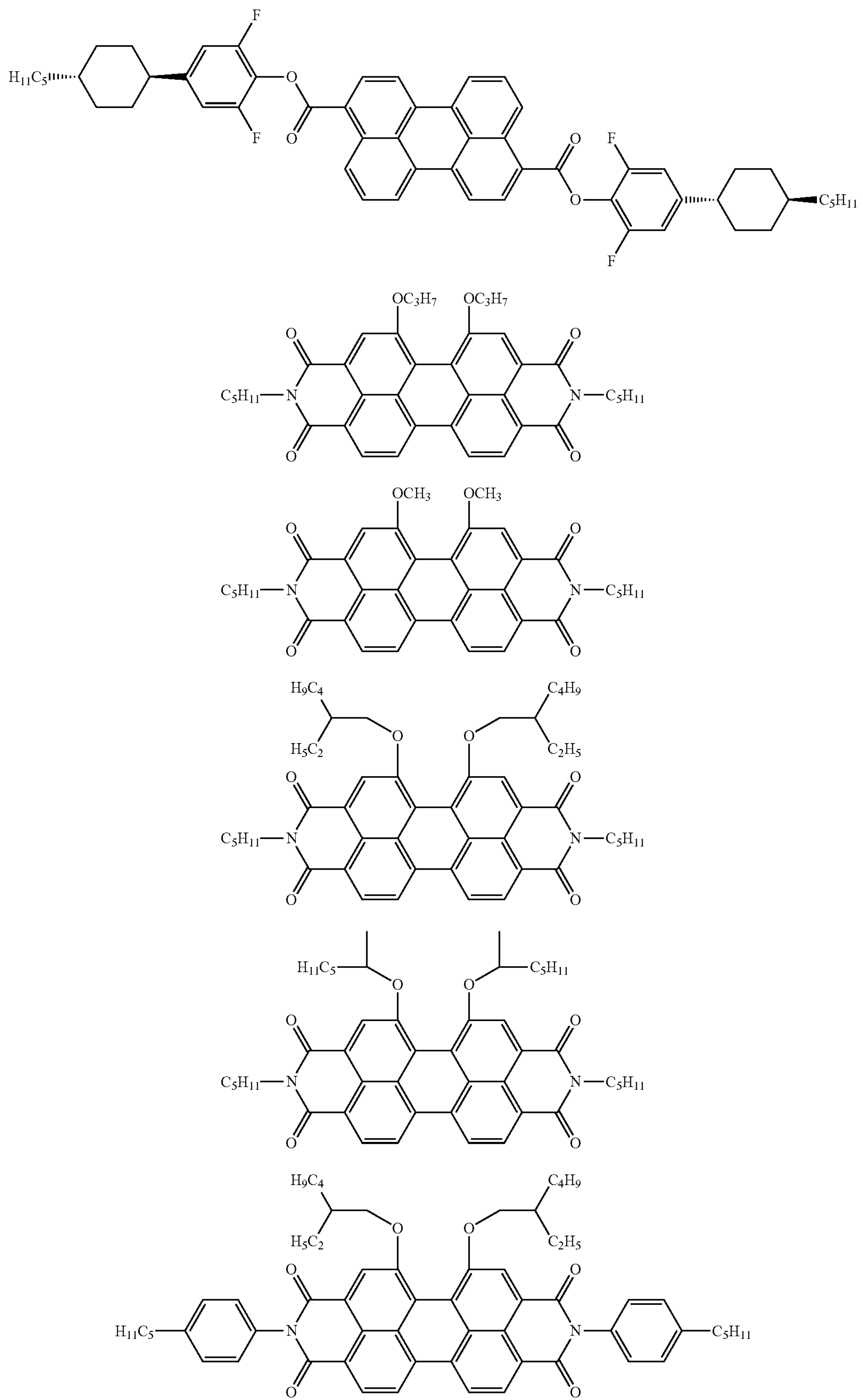

-continued
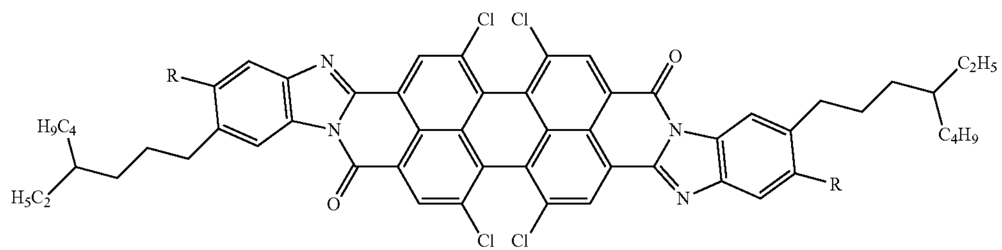
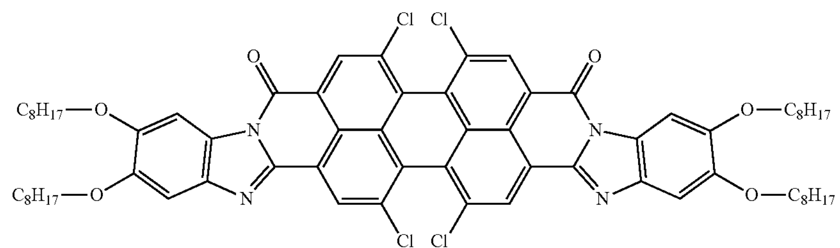
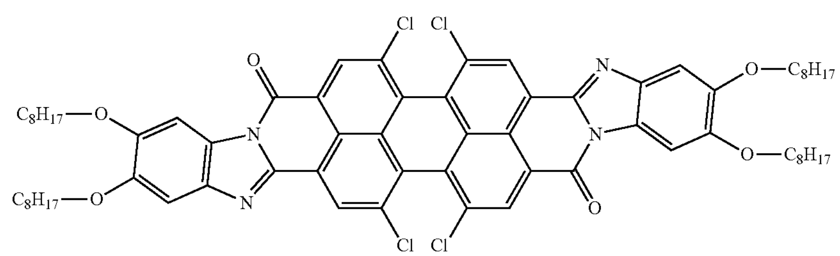
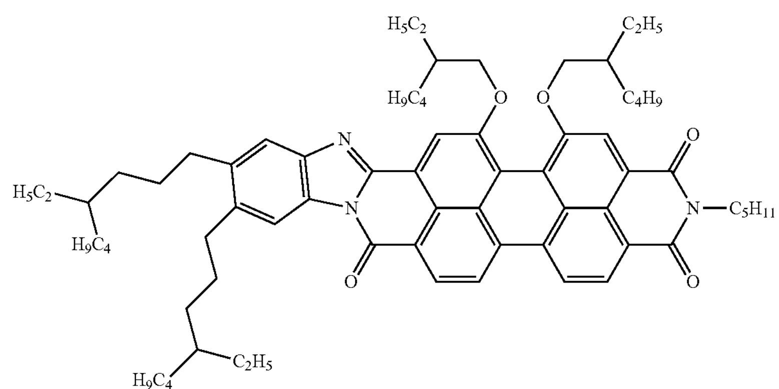
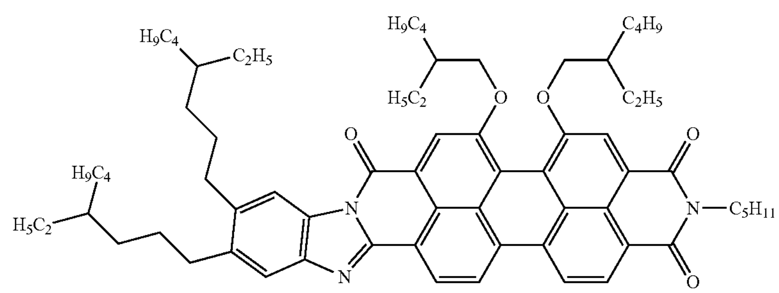

-continued
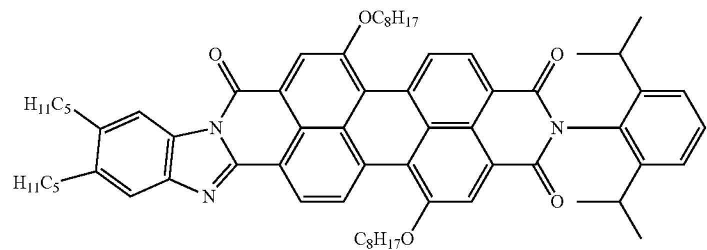
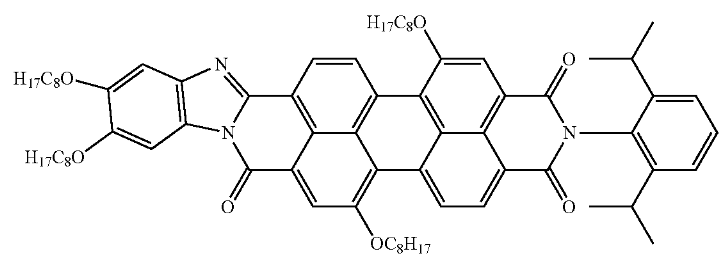
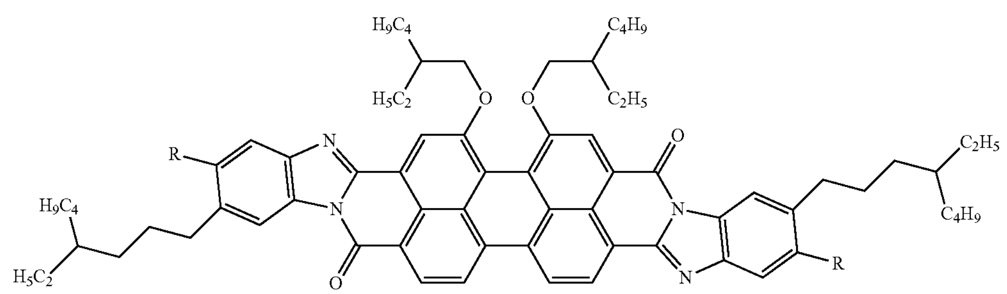
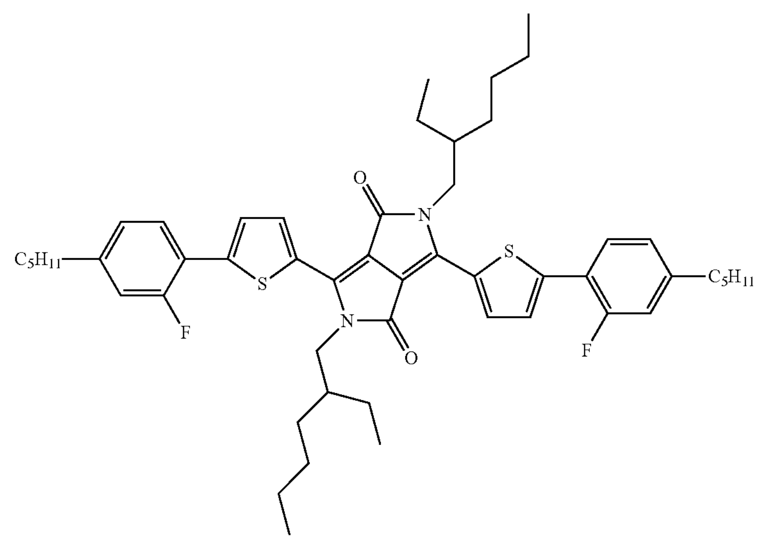

-continued
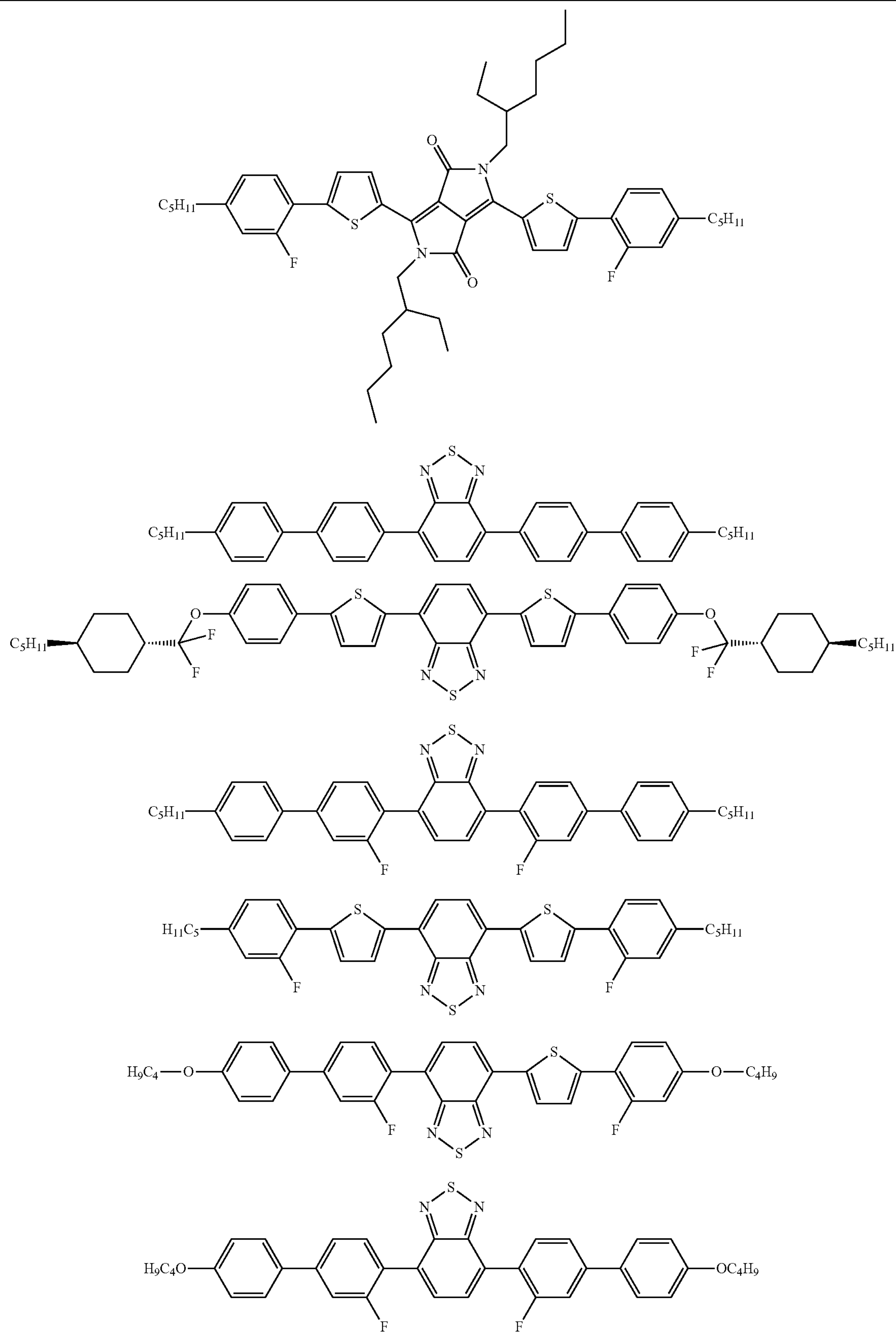

-continued
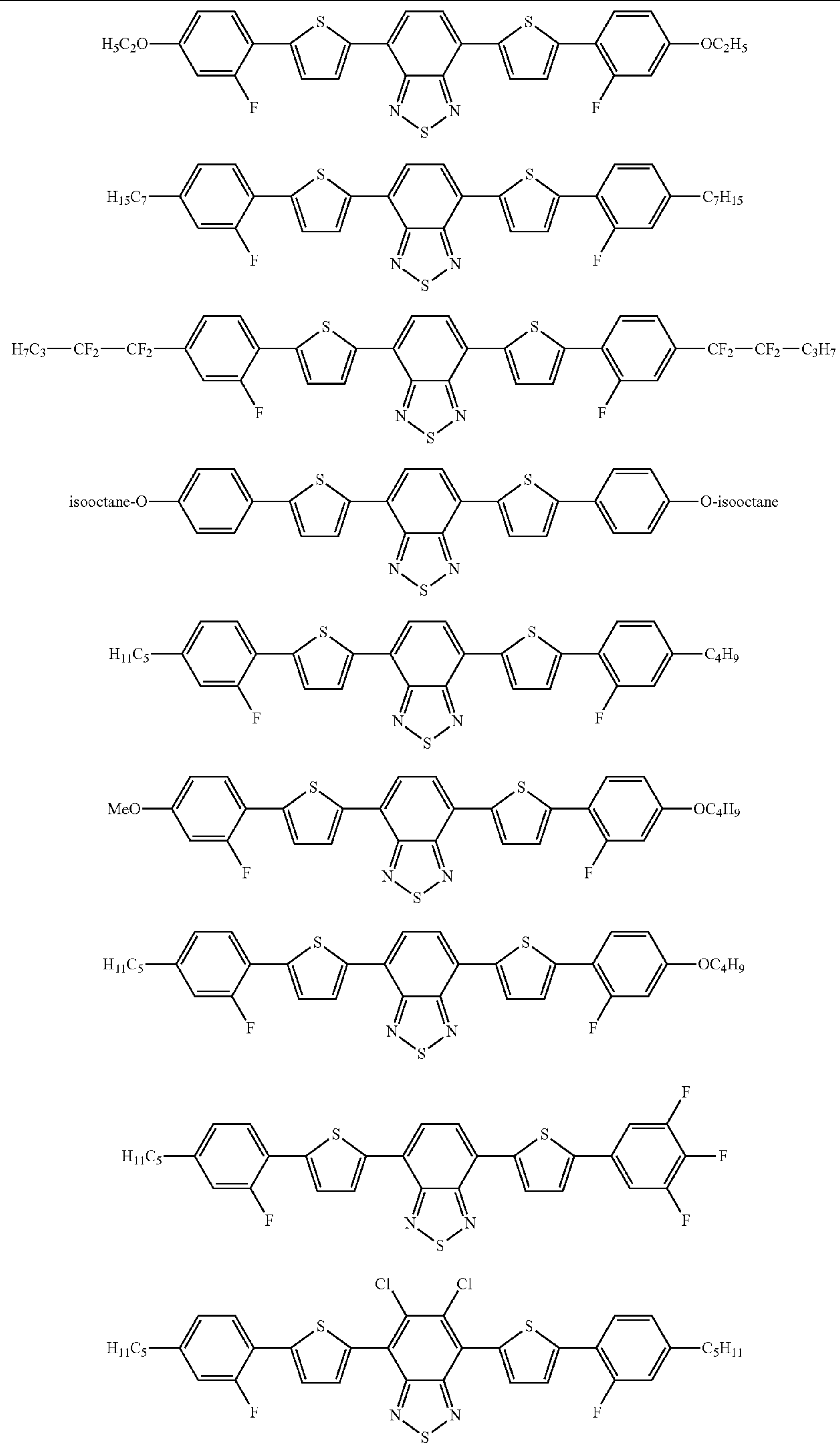
R = same alkyl chain as in the ortho position

The invention furthermore relates to the use of a liquid-crystalline material comprising a dye compound, where the liquid-crystalline material has a clearing point of at least 95° C. and comprises at least one compound V which contains at least one unit selected from units of the formulae (E-1), (E-2) and (E-3), in a device for regulating the passage of light.

The preferred embodiments of compound V are likewise preferred here, as are the further preferred embodiments indicated above in connection with the liquid-crystalline material according to the invention.

The liquid-crystalline material is present in the device in a layer. This layer is preferably switchable, i.e. is a switching layer.

The device according to the invention is preferably suitable for regulating the passage of light in the form of daylight from the environment into a space. The passage of light to be regulated takes place here from the environment (the outside space) into a space. The space here can be any desired space that is substantially sealed off from the environment, for example a building, a vehicle or a container. The device can generally be used for any desired spaces, particularly if the latter have only limited exchange of air with the environment and have light-transmitting boundary surfaces through which the entry of energy from the outside in the form of light energy can take place. Particularly relevant is the use of the device for spaces which are subjected to strong insolation through light-transmitting areas, for example through window areas.

The device according to the invention is preferably arranged in an opening of a relatively large two-dimensional structure, where the two-dimensional structure itself only allows slight passage of light or none at all, and where the opening transmits light to a greater extent in relative terms. The two-dimensional structure is preferably a wall or another delimitation of a space from the outside. The device according to the invention is preferably characterised in that it has an area of at least 0.05 $m^2$, preferably at least 0.1 $m^2$, particularly preferably at least 0.5 $m^2$ and very particularly preferably at least 0.8 $m^2$.

The device according to the invention is switchable. Switching here is taken to mean a change in the passage of light through the device. The device according to the invention is preferably electrically switchable.

If the device is electrically switchable, it preferably comprises two or more electrodes, which are installed on both sides of the switching layer comprising the liquid-crystalline material. The electrodes preferably consist of ITO or a thin, preferably transparent metal and/or metal-oxide layer, for example silver or FTO (fluorine-doped tin oxide), or an alternative material known to the person skilled in the art for this use. The electrodes are preferably provided with electrical connections. The voltage is preferably provided by a battery, a rechargeable battery or an external power supply.

The switching operation in the case of electrical switching takes place through alignment of the molecules of the liquid-crystalline material by application of voltage.

In a preferred embodiment, the device is converted from a state having high absorption, i.e. low light transmissivity, which is present without voltage, into a state having lower absorption, i.e. higher light transmissivity, by application of a voltage. The liquid-crystalline material in the layer in the device is preferably nematic in both states. The voltage-free state is preferably characterised in that the molecules of the liquid-crystalline material, and thus the molecules of the dye compound, are aligned parallel to the plane of the switching layer. This is preferably achieved by a correspondingly selected alignment layer. The state under voltage is preferably characterised in that the molecules of the liquid-crystalline material, and thus the molecules of the dye compound, are perpendicular to the plane of the switching layer.

In an alternative embodiment to the embodiment mentioned above, the device is converted from a state having low absorption, i.e. high light transmissivity, which is present without voltage, into a state having higher absorption, i.e. lower light transmissivity, by application of a voltage. The liquid-crystalline material in the layer in the device is preferably nematic in both states. The voltage-free state is preferably characterised in that the molecules of the liquid-crystalline material, and thus the molecules of the dye compound, are aligned perpendicular to the plane of the switching layer. This is preferably achieved by a correspondingly selected alignment layer. The state under voltage is preferably characterised in that the molecules of the liquid-crystalline material, and thus the molecules of the dye compound, are parallel to the plane of the switching layer.

According to a preferred embodiment of the invention, the device can be operated without an external power supply by providing the energy required by means of a solar cell or another device for the conversion of light and/or heat energy into electrical energy which is connected to the device. The provision of the energy by means of the solar cell can take place directly or indirectly, i.e. via a battery or rechargeable battery or other unit for the storage of energy connected in-between. The solar cell is preferably mounted on the outside of the device or is an internal component of the device, as disclosed, for example, in WO 2009/141295. Particular preference is given here to solar cells, which are particularly efficient in the case of diffuse light, and transparent solar cells.

The device according to the invention preferably has the following layer sequence, where further layers may additionally be present. The layers indicated below are preferably directly adjacent to one another in the device:

- substrate layer, preferably comprising glass or polymer
- electrically conductive transparent layer, preferably comprising ITO
- alignment layer
- switching layer comprising the liquid-crystalline material
- alignment layer
- electrically conductive transparent layer, preferably comprising ITO
- substrate layer, preferably comprising glass or polymer The preferred embodiments of the individual layers are described below.

The device according to the invention preferably comprises one or more, particularly preferably two, alignment layers. The alignment layers are preferably directly adjacent to the two sides of the layer comprising the liquid-crystalline material.

The alignment layers used in the device according to the invention can be any desired layers known to the person skilled in the art for this purpose. Preference is given to polyimide layers, particularly preferably layers comprising rubbed polyimide. Polyimide rubbed in a certain manner known to the person skilled in the art results in alignment of the molecules of the liquid-crystalline material in the rubbing direction if the molecules are parallel to the alignment layer (planar alignment). It is preferred here for the molecules of the liquid-crystalline material not to be completely planar on the alignment layer, but instead to have a slight pretilt angle. In order to achieve vertical alignment of the compounds of the liquid-crystalline material to the surface of the alignment layer (homeotropic alignment), polyimide treated in a certain manner is preferably employed as material for the alignment layer (polyimide for very high pretilt angles). Furthermore, polymers obtained by an exposure process to polarised light can be used as alignment layer in order to achieve alignment of the compounds of the liquid-crystalline material in accordance with an alignment axis (photo-alignment).

The layer comprising the liquid-crystalline material in the device according to the invention is furthermore preferably arranged between two substrate layers or enclosed thereby. The substrate layers can consist, for example, of glass or a polymer, preferably a light-transmitting polymer.

The device is preferably characterised in that it does not comprise a polymer-based polariser, particularly preferably does not comprise a polariser in the solid material phase and very particularly preferably comprises no polariser at all.

However, according to an alternative embodiment, the device may also comprise one or more polarisers. The polarisers in this case are preferably linear polarisers.

If precisely one polariser is present, its absorption direction is preferably perpendicular to the orientation axis of the compounds of the liquid-crystalline material of the device according to the invention on the side of the switching layer on which the polariser is located.

In the device according to the invention, both absorptive and also reflective polarisers can be employed. Preference is given to the use of polarisers which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light. Examples of absorptive polarisers which can be employed in the devices according to the invention are the Itos XP38 polariser film and the Nitto Denko GU-1220DUN polariser film. An example of a circular polariser which can be used in accordance with the invention is the APNCP37-035-STD polariser (American Polarizers). A further example is the CP42 polariser (ITOS).

The device according to the invention furthermore preferably comprises an optical waveguide system which transports light to a solar cell or another device for the conversion of light and/or heat energy into electrical energy, preferably as described in WO 2009/141295. The optical waveguide system collects and concentrates light hitting the device. It preferably collects and concentrates light emitted by the dye compound. The optical waveguide system is in contact with a device for the conversion of light energy into electrical energy, preferably a solar cell, so that the collected light hits the latter in concentrated form. In a preferred embodiment of the invention, the device for the conversion of light energy into electrical energy is mounted at the edge of the device, integrated into the latter and electrically connected to means for the electrical switching of the device according to the invention.

In a preferred embodiment, the device according to the invention is a component of a window, particularly preferably a window comprising at least one glass surface, very particularly preferably a window which comprises multipane insulating glass.

Window here is taken to mean, in particular, a structure in a building which comprises a frame and at least one glass pane surrounded by this frame. It preferably comprises a heat-insulating frame and two or more glass panes (multipane insulating glass).

According to a preferred embodiment, the device according to the invention is applied directly to a glass surface of a window, particularly preferably in the interspace between two glass panes of multipane insulating glass.

The invention furthermore relates to a window containing a device according to the invention, preferably having the preferred features indicated above.

WORKING EXAMPLES

A) Preparation of Liquid-Crystalline Mixtures

The two comparative mixtures V1 and V2 are prepared. Furthermore, the liquid-crystalline mixtures E1 to E10 are prepared, which are mixtures in accordance with the present application.

The composition of mixtures V1, V2 and E1-E10 is indicated below. The chemical structures of the individual constituents of the mixtures are reproduced here by means of abbreviations (acronyms). These abbreviations are explicitly presented and explained in WO 2012/052100 (pp. 63-89), and consequently reference is made to the said application for explanation.

The following abbreviations do not correspond to the said nomenclature, and consequently the corresponding chemical structures are shown explicitly.

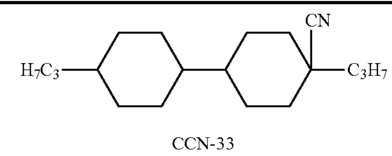

CCN-33

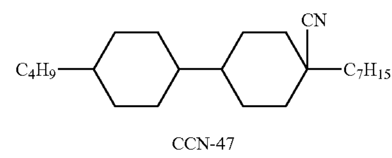

CCN-47

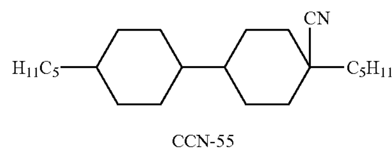

CCN-55

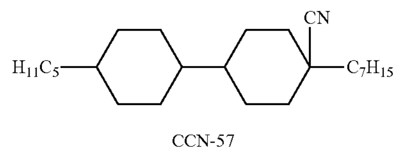

CCN-57

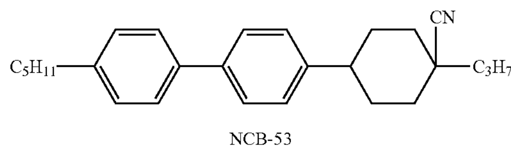

NCB-53

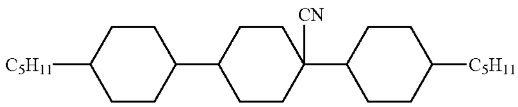

-continued

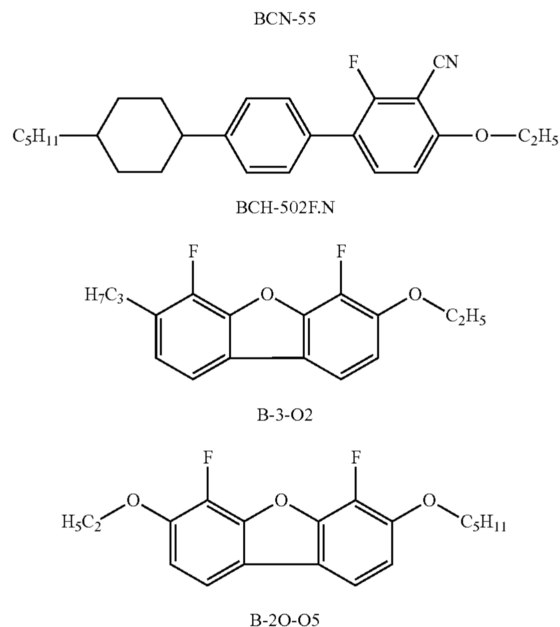

For the mixtures, the clearing point in degrees Celsius, the optical anisotropy Δn and the dielectric anisotropy Δε are indicated. The physical properties are determined in accordance with "Merck Liquid Crystals, Physical Properties of Liquid Crystals", Status November 1997, Merck KGaA, Germany, and apply for a temperature of 20° C. The value of Δn is determined at 589 nm and the value of Δε is determined at 1 kHz.

The low-temperature stability is determined in bottles and in test cells with a thickness of about 6 microns, in each case at room temperature (+20° C.) and at the temperatures −20° C., −30° C. and −40° C.

The samples are subjected to a visual inspection for crystals or the formation of smectic phases at intervals of 24 h. The test is continued so long as crystals or smectic phases are not observed in the bottle or test cell at any of the said temperatures. As soon as crystals or smectic phases are observed, even in only one of the samples, the test is ended, and the number of days reached is indicated as low-temperature stability.

TABLE 1

| Mixture | V1 | | V2 | |
|---|---|---|---|---|
| Clearing point in ° C. | 91.5 | | 79.5 | |
| Δε | −3.7 | | −3.1 | |
| Δn | 0.078 | | 0.100 | |
| Low-temperature stability | 8 days | | 42 days | |
| Composition | CY-3-O2 | 12 | CY-3-O2 | 12 |
| | CY-5-O2 | 12 | CY-5-O2 | 13 |
| | CCY-3-O2 | 13 | CCY-3-O2 | 11 |
| | CCY-5-O2 | 13 | CCY-5-O2 | 10 |
| | CCY-3-1 | 8 | CCY-2-1 | 9 |
| | CCZC-3-3 | 4 | CPP-3-2 | 6 |
| | CCZC-3-5 | 3 | CPP-5-2 | 4 |
| | CCZC-4-3 | 3 | CGP-3-2 | 6 |
| | CC-3-4 | 6 | CC-3-4 | 6 |
| | CC-3-5 | 6 | CC-3-5 | 6 |
| | CC-3-O3 | 8 | CP-3-O2 | 17 |

TABLE 1-continued

| Mixture | V1 | | V2 |
|---|---|---|---|
| | CC-5-O1 | 4 | |
| | CC-5-O2 | 4 | |
| | CP-3-O2 | 4 | |

TABLE 2

| Mixture | E1 | | E2 | |
|---|---|---|---|---|
| Clearing point in ° C. | 100.5 | | 106 | |
| Δε | −4.8 | | −6 | |
| Δn | 0.044 | | 0.118 | |
| Low-temperature stability | >42 days | | >73 days | |
| Composition | CCN-47 | 20 | CCN-33 | 10 |
| | CCN-55 | 21 | CCN-47 | 10 |
| | CC-3-O1 | 11 | CCN-57 | 10 |
| | CC-5-O1 | 5 | CY-3-O2 | 5 |
| | CC-5-O2 | 5 | NCB-53 | 13 |
| | CCZC-3-3 | 4 | CCY-3-O2 | 5 |
| | CCZC-3-5 | 4 | CCY-3-O3 | 5 |
| | CCZC-4-3 | 4 | CCY-4-O2 | 6 |
| | CCZC-4-5 | 4 | CPY-2-O2 | 9 |
| | BCN-55 | 22 | CPY-3-O2 | 8 |
| | | | PYP-2-3 | 7 |
| | | | PYP-2-4 | 6 |
| | | | CGPC-3-3 | 2 |
| | | | CGPC-5-3 | 2 |
| | | | CGPC-5-5 | 2 |

TABLE 3

| Mixture | E3 | | E4 | |
|---|---|---|---|---|
| Clearing point in ° C. | 113.5 | | 107.5 | |
| Δε | −6.0 | | −4.9 | |
| Δn | 0.127 | | 0.103 | |
| Low-temperature stability | >100 days | | >83 days | |
| Composition | CCN-33 | 8 | CCN-33 | 13 |
| | CCN-47 | 8 | CCN-47 | 15 |
| | CCN-55 | 9 | CCN-55 | 12 |
| | CY-3-O2 | 5 | NCB-53 | 10 |
| | NCB-53 | 12 | CPY-2-O2 | 5 |
| | CCY-3-O2 | 5 | CPY-3-O2 | 5 |
| | CCY-3-O3 | 5 | CCY-4-O2 | 5 |
| | CCY-4-O2 | 6 | PYP-2-3 | 10 |
| | CPY-2-O2 | 9 | CP-3-O1 | 8 |
| | CPY-3-O2 | 8 | CGPC-3-3 | 4 |
| | PYP-2-3 | 7 | CGPC-5-3 | 3 |
| | PYP-2-4 | 6 | CGPC-5-5 | 3 |
| | CGPC-3-3 | 2 | CCZPC-3-3 | 3 |
| | CGPC-5-3 | 2 | CCZPC-3-4 | 2 |
| | CGPC-55 | 2 | CCZPC-3-5 | 2 |
| | CPP-3-2 | 3 | | |
| | CPP-5-2 | 3 | | |

TABLE 4

| Mixture | E5 | | E6 | |
|---|---|---|---|---|
| Clearing point in ° C. | 111.5 | | 107.5 | |
| Δε | −4.7 | | 5.5 | |
| Δn | 0.124 | | 0.129 | |
| Low-temperature stability | >73 days | | >73 days | |
| Composition | CCN-47 | 10 | CCN-33 | 8 |
| | CCN-55 | 10 | CCN-47 | 10 |
| | CY-3-O2 | 6 | CCN-55 | 10 |

TABLE 4-continued

| Mixture | E5 | | E6 | |
|---|---|---|---|---|
| | CP-3-O1 | 10 | CY-3-O2 | 10 |
| | NCB-53 | 10 | BCH-502F.N | 10 |
| | CPY-2-O2 | 7 | CPY-2-O2 | 6 |
| | CPY-3-O2 | 7 | CPY-3-O2 | 9 |
| | CCY-3-O2 | 6 | CCY-4-O2 | 5 |
| | CCY-5-O2 | 7 | PYP-2-3 | 10 |
| | PYP-2-3 | 10 | PYP-2-4 | 10 |
| | CGP-3-2 | 6 | CGPC-3-3 | 3 |
| | CGPC-3-3 | 3 | CGPC-5-3 | 3 |
| | CGPC-5-3 | 3 | CGPC-5-5 | 3 |
| | CGPC-5-5 | 2 | CCZPC-3-3 | 3 |
| | CCZPC-3-3 | 3 | | |

TABLE 5

| Mixture | E7 | | E8 | |
|---|---|---|---|---|
| Clearing point in ° C. | 110.5 | | 74 | |
| Δε | −4.9 | | −3.5 | |
| Δn | 0.132 | | 0.101 | |
| Low-temperature stability | >76 days | | 13 days | |
| Composition | CY-3-O2 | 9 | CC-3-V | 41.5 |
| | CY-3-O4 | 9 | CCY-3-O1 | 5 |
| | CY-5-O2 | 12 | CCY-3-O2 | 11 |
| | CY-5-O4 | 8 | CCY-4-O2 | 6 |
| | CCY-3-O2 | 5 | CPY-2-O2 | 5 |
| | CCY-3-O3 | 5 | CPY-3-O2 | 11 |
| | CCY-4-O2 | 5 | CY-3-O2 | 3.5 |
| | CPY-2-O2 | 7 | PY-3-O2 | 12 |
| | CPY-3-O2 | 6 | B-3-O2 | 5 |
| | PYP-2-3 | 12 | | |
| | CCP-V-1 | 6 | | |
| | CCZPC-3-3 | 3 | | |
| | CCZPC-3-4 | 3 | | |
| | CGPC-3-3 | 5 | | |
| | CGPC-5-3 | 5 | | |

TABLE 6

| Mixture | E9 | | E10 | |
|---|---|---|---|---|
| Clearing point in ° C. | 74 | | 87 | |
| Δε | −3.6 | | −4.8 | |
| Δn | 0.101 | | 0.103 | |
| Low-temperature stability | 15 days | | not det. | |
| Composition | CC-3-V | 40.5 | CY-3-O2 | 12.5 |
| | CCY-3-O1 | 5 | CCY-3-O1 | 9 |
| | CCY-3-O2 | 11 | CCY-3-O2 | 11 |
| | CCY-4-O2 | 6 | CCY-4-O2 | 7 |
| | CPY-2-O2 | 5.5 | CPY-3-O2 | 3 |
| | CPY-3-O2 | 11 | CC-3-V | 31 |
| | CY-3-O2 | 5 | B-2O-O5 | 4 |
| | PY-3-O2 | 12 | PY-V2-O2 | 5.5 |
| | B-3-O2 | 4 | CPY-V-O2 | 6 |
| | | | CPY-V-O4 | 5 |
| | | | CCY-V-O2 | 6 |

B) Preparation of Liquid-Crystalline Mixtures Comprising Dyes and Determination of their Physical Properties Of all mixtures E1-E10 shown under A), mixtures comprising one or more dyes are prepared. A representative selection of the results is shown below.

B-1) Preparation of Mixtures Comprising the Dye F1 and Determination of Degree of Anisotropy and Solubility Mixtures comprising the dye F1 in one of the liquid-crystalline mixtures V1, E1, E2, E3 and E7 are prepared (composition see table below)

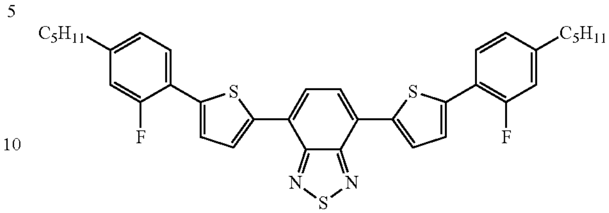

Dye F1

The degree of anisotropy R is determined from the value for the extinction coefficient E(p) (extinction coefficient of the mixture on parallel alignment of the molecules to the direction of polarisation of the light) and the value for the extinction coefficient of the mixture E(s) (extinction coefficient of the mixture on perpendicular alignment of the molecules to the direction of polarisation of the light), in each case at the wavelength of the maximum of the absorption band of the dye in question. If the dye has a plurality of absorption bands, the longest-wavelength absorption band is selected. The alignment of the molecules of the mixture is achieved by means of an alignment layer, as is known to the person skilled in the art in the area of LC devices. In order to eliminate the influences caused by liquid-crystalline medium, other absorptions and/or reflections, a measurement is in each case carried out against an identical mixture comprising no dye and the value obtained is subtracted.

The measurement is carried out using linear-polarised light, whose direction of vibration is either parallel to the alignment direction (determination of E(p)) or perpendicular to the alignment direction (determination of E(s)). This can be achieved by means of a linear polariser, where the polariser is rotated against the device in order to achieve the two different directions of vibration. The measurement of E(p) and E(s) is thus carried out via the rotation of the direction of vibration of the incident polarised light. Alternatively, the sample can also be rotated against a spatially fixed direction of polarisation of the incident polarised light.

The degree of anisotropy R is calculated from the values obtained for E(s) and E(p) in accordance with the formula $$R=[E(p)-E(s)]/[E(p)+2*E(s)],$$

as indicated, inter alia, in "Polarized Light in Optics and Spectroscopy", D. S. Kliger et al., Academic Press, 1990. A detailed description of the method for the determination of the degree of anisotropy of liquid-crystalline media comprising a dichroic dye can be found in B. Bahadur, Liquid Crystals—Applications and Uses, Vol. 3, 1992, World Scientific Publishing, Section 11.4.2.

The said method is employed identically in all following examples.

| Liquid-crystalline mixture | Dye | Concentration of the dye | Wavelength of maximum absorption | Degree of anisotropy |
|---|---|---|---|---|
| V1 (comp.) | F1 | 0.25% by weight | 504 nm | 0.73 |
| E1 | F1 | 0.25% by weight | 507 nm | 0.74 |
| E2 | F1 | 0.25% by weight | 507 nm | 0.75 |
| E3 | F1 | 0.25% by weight | 506 nm | 0.75 |
| E7 | F1 | 0.25% by weight | 505 nm | 0.77 |

The results show that the degree of anisotropy in the mixtures according to the invention is higher than in the comparative mixture.

Furthermore, the solubility of the dye F1 in the various liquid-crystalline mixtures at +20° C. and −20° C. is investigated.

| Liquid-crystal-line mixture | Dye | Temperature | Maximum solubility (observation after 1 week) |
|---|---|---|---|
| V1 (comp.) | F1 | +20° C. | 1.4% by weight |
| V1 (comp.) | F1 | −20° C. | 0.9% by weight |
| E1 | F1 | +20° C. | 1.4% by weight |
| E1 | F1 | −20° C. | 3.3% by weight |
| E2 | F1 | +20° C. | 4% by weight |
| E2 | F1 | −20° C. | 4% by weight |
| E7 | F1 | +20° C. | 1.3% by weight |
| E7 | F1 | −20° C. | 3.3% by weight |

It is found here that the solubility in the mixtures according to the invention is significantly higher than in the comparative mixture.

B-2) Preparation of Mixtures Comprising the Dye F2 and Determination of Degree of Anisotropy and Solubility The procedure is as indicated in B-1).

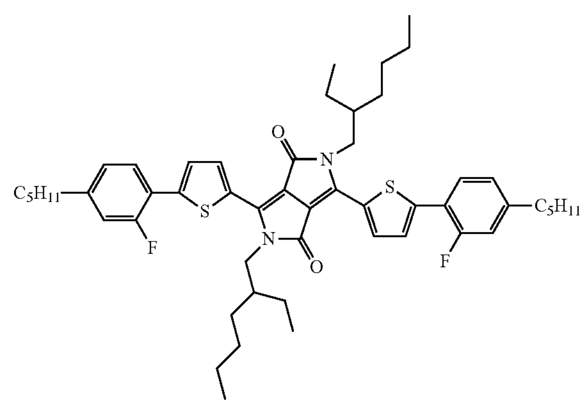

Dye F2

| Liquid-crystal-line mixture | Dye | Concentration of the dye | Wavelength of maximum absorption | Degree of anisotropy |
|---|---|---|---|---|
| V1 (comp.) | F2 | 0.25% by weight | 615 nm | 0.81 |
| E2 | F2 | 0.25% by weight | 615 nm | 0.80 |
| E3 | F2 | 0.25% by weight | 617 nm | 0.81 |
| E7 | F2 | 0.25% by weight | 617 nm | 0.81 |

| Liquid-crystal-line mixture | Dye | Temperature | Maximum solubility (observation after 1 week) |
|---|---|---|---|
| V1 (comp.) | F2 | +20° C. | 2.0% by weight (1) |
| V1 (comp.) | F2 | −20° C. | 1.8% by weight (1) |
| E2 | F2 | +20° C. | 2.6% by weight (1) |
| E2 | F2 | −20° C. | 2.0% by weight (1) |
| E3 | F2 | +20° C. | 1.2% by weight (4) |
| E3 | F2 | −20° C. | 1.8% by weight (4) |
| E7 | F2 | +20° C. | 1.4% by weight (12) |
| E7 | F2 | −20° C. | 1.8% by weight (12) |

The results show that improved solubilities at the same time as comparable degrees of anisotropy are achieved with the liquid-crystalline mixtures according to the invention.

B-3) Preparation of Mixtures Comprising the Dye F3 and Determination of Degree of Anisotropy and Solubility The procedure is as indicated in B-1).

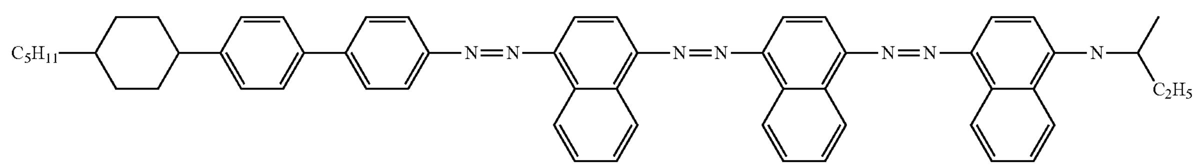

Dye F3

| Liquid-crystal-line mixture | Dye | Concentration of the dye | Wavelength of maximum absorption | Degree of anisotropy |
|---|---|---|---|---|
| V1 (comp.) | F3 | 0.25% by weight | 613 nm | 0.81 |
| E2 | F3 | 0.25% by weight | 630 nm | 0.78 |
| E7 | F3 | 0.25% by weight | 617 nm | 0.84 |

| Liquid-crystal-line mixture | Dye | Temperature | Maximum solubility (observation after week) |
|---|---|---|---|
| V1 (comp.) | F3 | +20° C. | 0.8% by weight |
| V1 (comp.) | F3 | −20° C. | 2.3% by weight |
| E1 | F3 | +20° C. | 3.9% by weight |
| E1 | F3 | −20° C. | 4.0% by weight |
| E2 | F3 | +20° C. | 4.5% by weight |
| E2 | F3 | −20° C. | 4.6% by weight |
| E7 | F3 | +20° C. | 4.1% by weight |
| E7 | F3 | −20° C. | 4.1% by weight |

The results show that improved solubilities at the same time as comparable degrees of anisotropy are achieved with the liquid-crystalline mixtures according to the invention.

B-4) Preparation of Mixtures Comprising the Dye F4 and Determination of Degree of Anisotropy and Solubility The procedure is as indicated in B-1).

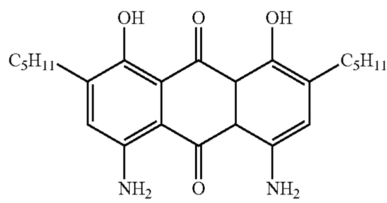

Dye F4

| Liquid-crystal-line mixture | Dye | Concentration of the dye | Wavelength of maximum absorption | Degree of anisotropy |
|---|---|---|---|---|
| V1 (comp.) | F4 | 0.25% by weight | 630 nm | 0.68 |
| E3 | F4 | 0.25% by weight | 633 nm | 0.68 |
| E7 | F4 | 0.25% by weight | 631 nm | 0.71 |

The results show that comparable or better degrees of anisotropy are achieved with the liquid-crystalline mixtures according to the invention than with comparative mixture V1.

B-5) Preparation of Mixtures Comprising the Dye F5 and Determination of Degree of Anisotropy and Solubility The procedure is as indicated in B-1).

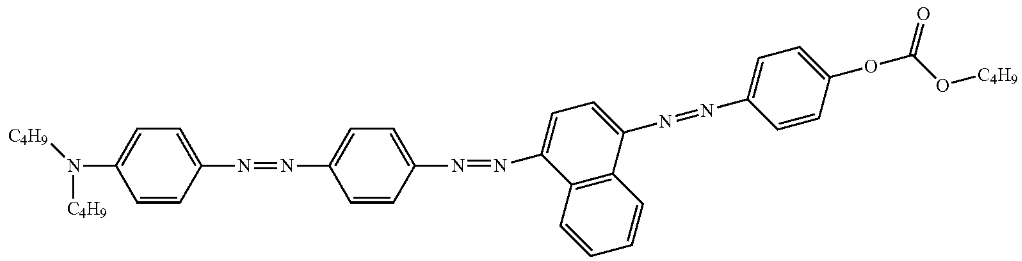

Dye F5

| Liquid-crystal-line mixture | Dye | Concentration of the dye | Wavelength of maximum absorption | Degree of anisotropy |
|---|---|---|---|---|
| V1 (comp.) | F5 | 0.25% by weight | 539 nm | 0.80 |
| E3 | F5 | 0.25% by weight | 545 nm | 0.80 |
| E7 | F5 | 0.25% by weight | 543 nm | 0.81 |

The mixtures according to the invention exhibit equally good or better degrees of anisotropy as comparative mixture V1 for the dye F5.

B-6) Preparation of Mixtures Comprising the Dye F6 and Determination of Degree of Anisotropy and Solubility The procedure is as indicated in B-1).

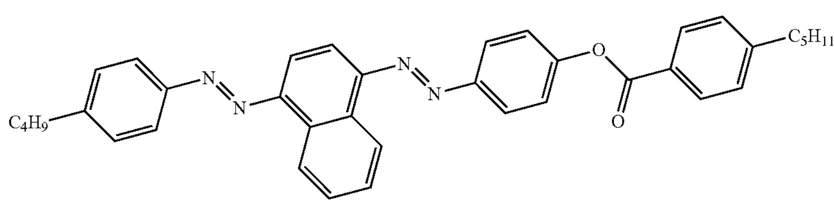

Dye F6

| Liquid-crystal-line mixture | Dye | Concentration of the dye | Wavelength of maximum absorption | Degree of anisotropy |
|---|---|---|---|---|
| V1 (comp.) | F6 | 0.25% by weight | 447 nm | 0.81 |
| E3 | F6 | 0.25% by weight | 453 nm | 0.81 |
| E7 | F6 | 0.25% by weight | 451 nm | 0.81 |

The example shows that the mixtures according to the invention have similar degrees of anisotropy as comparative mixture V1 for the dye F6.

Similar values for degree of anisotropy and solubility of the dyes are obtained with comparative mixture V2 as for comparative mixture V1.

The above examples show that liquid-crystalline mixtures comprising a wide variety of dyes can be prepared with the compounds according to the invention. The mixtures obtained are distinguished by high degrees of anisotropy and high solubility of the dye compounds at the same time as high solution stability and are thus highly suitable for use in devices for regulating the passage of light.

C) Use of Mixture E7 According to the Invention in a Device for Regulating the Passage of Light C-1) A mixture of liquid-crystalline mixture E7 and dyes F1 (0.10% by weight), F2 (0.23% by weight), F7 (0.09% by weight) and F8 (0.33% by weight) is prepared.

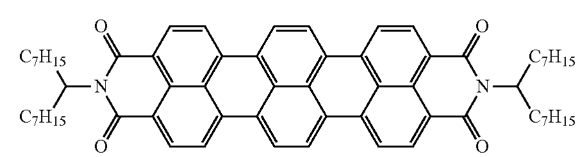

Dye F7

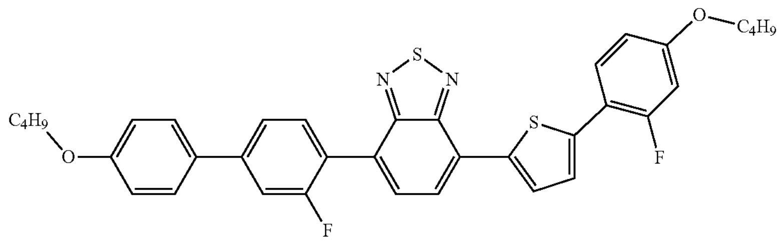

Dye F8

The degree of anisotropy is determined for the mixture by the method indicated above. This is 0.8 over a broad range of the wavelength of the light from 430 nm to 630 nm.

The liquid-crystalline material comprising the dyes is introduced into a device for regulating the passage of light. This has the following layer sequence:

glass substrate layer
electrically conductive transparent ITO layer, 200 Ångström
polyimide alignment layer, rubbed antiparallel
switching layer comprising the liquid-crystalline material, 24.4 μm
polyimide alignment layer
electrically conductive transparent ITO layer
glass substrate layer In this arrangement, the liquid-crystalline material is in a planar alignment with antiparallel pretilt angle. This alignment is achieved by polyimide layers rubbed antiparallel to one another. The thickness of the liquid-crystal layer is controlled by spacers. The ITO layer is provided with electrical contacts, so that an electrical voltage can be applied via the switching layer comprising the liquid-crystalline material.

Application of voltage enables colour-neutral switching of the device between dark (no voltage) and bright (voltage) to be achieved. The colour impression here is grey.

The following values for the light transmissivity $\tau_v$ are obtained for the device in the two switching states:

$\tau_{v\ bright}$=84%

$\tau_{v\ dark}$=49%.

The light transmissivities $\tau_{v\ pale}$ and $\tau_{v\ dark}$ are calculated in accordance with European Standard EN410, equation (1) (Determination of luminous and solar characteristics of glazing). The light transmissivities $\tau_v$ in accordance with this standard take into account the relative spectral distribution of the standard illuminant and the spectral brightness sensitivity of the standard observer.

A further device according to the invention which comprises two switching layers is produced, as disclosed in the working examples of the as yet unpublished application EP13002445.8. The device has the following layer arrangement:

glass layer
ITO layer, 200 Ångström
polyimide alignment layer, rubbed antiparallel
switching layer comprising the liquid-crystalline material, 24.4 μm
polyimide alignment layer, rubbed antiparallel
ITO layer, 200 Ångström
glass layer
layer sequence as for the above-mentioned 7 layers, rotated by 90° thereto about an axis perpendicular through the layers.

The following values for the light transmissivity $\tau_v$ are obtained for the device in the two switching states:

$\tau_{v\ bright}$=71%

$\tau_{v\ dark}$=11%.

C-2) A mixture of liquid-crystalline mixture E7 and dyes F1 (0.103% by weight), F8 (0.287% by weight), F9 (0.101% by weight) and F10 (0.518% by weight) is prepared.

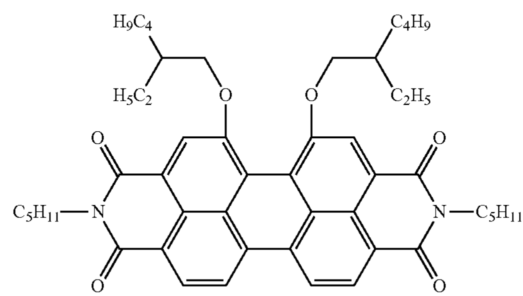

Dye F9

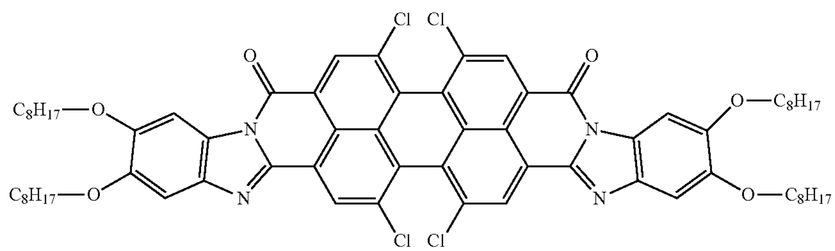

Dye F10

A device for regulating the passage of light having a single switching layer is produced using this mixture, as indicated above under 1).

The following values for the light transmissivity $\tau_v$ are obtained for the device in the two switching states:

$\tau_{v\ bright}$=81%

$\tau_{v\ dark}$=47%.

In addition, a device for regulating the passage of light having a double switching layer is produced using this mixture, as likewise indicated above under 1).

The following values for the light transmissivity $\tau_v$ are obtained for the device in the two switching states:

$\tau_{v\ bright}$=66%

$\tau_{v\ dark}$=10%.

C-3) A mixture of liquid-crystalline mixture E7 and dyes F1 (0.048% by weight), F8 (0.223% by weight), F9 (0.116% by weight) and F11 (0.679% by weight) is prepared.

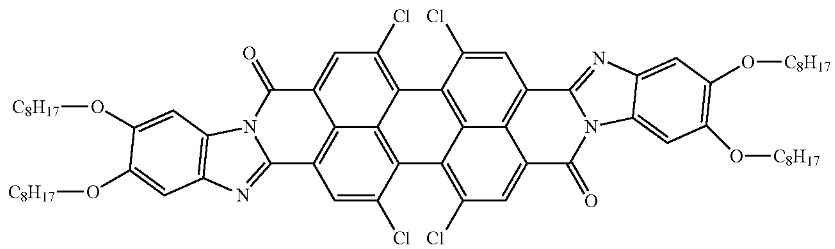

Dye F11

A device for regulating the passage of light having a single switching layer is produced using this mixture, as indicated above under 1).

The following values for the light transmissivity $\tau_v$ are obtained for the device in the two switching states:

$\tau_{v\ bright}$=82%

$\tau_{v\ dark}$=48%.

In addition, a device for regulating the passage of light having a double switching layer is produced using this mixture, as likewise indicated above under 1).

The following values for the light transmissivity $\tau_v$ are obtained for the device in the two switching states:

$\tau_{v\ bright}$=68%

$\tau_{v\ dark}$=12%.

The invention claimed is:

1. A window which is suitable for regulating the passage of light in the form of daylight from the environment into a space, said window containing a switching device for regulating the passage of light between a bright state and a dark state which does not comprise a polariser, said switching device comprising a layer which comprises a liquid-crystalline material comprising at least three different dye compounds, where the liquid-crystalline material has a clearing point of at least 95° C. and comprises at least one compound V which contains at least one unit selected from units of the formulae (E-1), (E-2) and (E-3), formula (E-1)

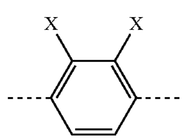

-continued formula (E-2)

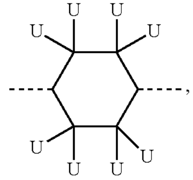

formula (E-3)

U U U U U U U U , where

X is selected on each occurrence, identically or differently, from F, Cl, Br, I, —CN, —NCO, —NCS, —SCN, —OCN, —NC, —CNO, —CNS and $N_3$;

W is selected on each occurrence, identically or differently, from F, Cl, Br, I, —CN, —NCO, —NCS, —SCN, —OCN, —NC, —CNO, —CNS and $N_3$;

U is selected on each occurrence, identically or differently, from H, F, Cl, Br, I, CN, —NCO, —NCS, —SCN, —OCN, —NC, —CNO, —CNS, $N_3$, and alkyl, alkoxy or alkylthio groups having 1 to 10 C atoms, where one or more hydrogen atoms in the alkyl, alkoxy or alkylthio groups may be replaced by F or Cl, and where one or more $CH_2$ groups in the alkyl, alkoxy or alkylthio groups may be replaced by O or S;

dashed lines symbolise bonds to the remainder of the compound, and at least one group U per unit of the formula (E-3) is selected from F, Cl, Br, I, CN, —NCO, —NCS, —SCN, —OCN, —NC, —CNO, —CNS and $N_3$, and wherein the liquid-crystalline material additionally comprises one or more compounds which conform to the formula (F-1-2)

(F-1-2)

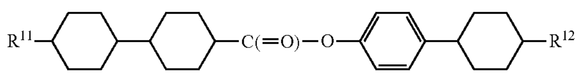

$R^{11}$, $R^{12}$ represent on each occurrence, identically or differently F, Cl, —CN, —NCS, —SCN, $R^3$—O—CO—, $R^3$—CO—O— or an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more $CH_2$ groups may be replaced by O or S.

2. A window according to claim 1, wherein X is selected on each occurrence, identically or differently, from F and —CN.

3. A window according to claim 1, wherein W is equal to —CN.

4. A window according to claim 1, wherein U is selected on each occurrence, identically or differently, from H, F and —CN.

5. A window according to claim 1, wherein the compound V contains precisely one unit selected from units of the formulae (E-1), (E-2) and (E-3).

6. A window according to claim 1, wherein the compound V has a structure of the following formula:

formula (V)

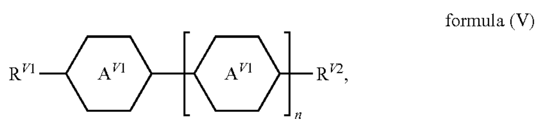

where $R^{V1}$, $R^{V2}$ represent on each occurrence, identically or differently, an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more $CH_2$ groups may be replaced by O or S;

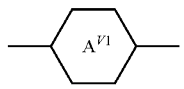

is selected on each occurrence, identically or differently, from the following groups:

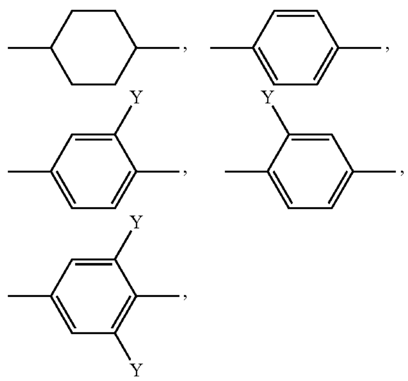

or units of the formula (E-1), (E-2) or (E-3);

Y is selected on each occurrence, identically or differently, from F, Cl, CN, and alkyl, alkoxy or alkylthio groups having 1 to 10 C atoms, where one or more hydrogen atoms in the alkyl, alkoxy or alkylthio groups may be replaced by F or Cl, and where one or more $CH_2$ groups in the alkyl, alkoxy or alkylthio groups may be replaced by O or S;

n is equal to 1, 2 or 3; and where at least one of the groups

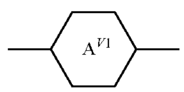

is selected from units of the formula (E-1), (E-2) or (E-3).

7. A window according to claim 6, wherein the compound of the formula (V) contains precisely one unit selected from units of the formulae (E-1), (E-2) and (E-3).

8. A window according to claim 6, wherein the index n in formula (V) is equal to 1 or 2.

9. A window according to claim 6, wherein $A^{V1}$ in formula (V) is selected on each occurrence, identically or differently, from

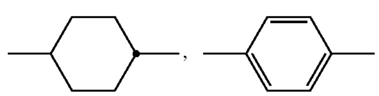

and units of the formulae (E-1-1a), (E-1-2a), (E-1-3a), (E-2-1) and (E-3-1)

formula (E-1-1a)

formula (E-1-2a)

formula (E-1-3a)

formula (E-2-1)

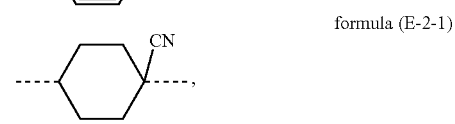

formula (E-3-1)

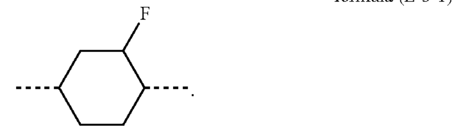

10. A window according to claim 1, wherein the liquid-crystalline material has a clearing point of at least 100° C.

11. A window according to claim 1, wherein the liquid-crystalline material has a dielectric anisotropy Δε of −2 to −10.

12. A window according to claim 1, wherein the liquid-crystalline material comprises 5 to 15 compounds V, each having a different structure.

13. A window according to claim 1, wherein the liquid-crystalline material has a total proportion of compounds V of at least 40% by weight.

14. A window according to claim 1, wherein the liquid-crystalline material comprises compounds selected from compounds V which contain at least one unit of the formula (E-2), and compound(s) of the formula (F-1-2) in a total proportion of at least 10% by weight.

15. A window according to claim 1, wherein the liquid-crystalline material additionally comprises one or more compounds which conform to the formula (F-2),

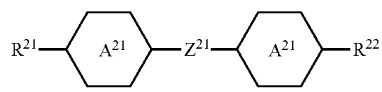

(F-2)

where $R^{21}$, $R^{22}$ represent on each occurrence, identically or differently, F, Cl, —CN, —NCS, —SCN, $R^3$—O—CO—, $R^3$—CO—O— or an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more $CH_2$ groups may be replaced by O or S; and $R^3$ represents on each occurrence, identically or differently, an alkyl group having 1 to 10 C atoms, in which one or more hydrogen atoms may be replaced by F or Cl, and in which one or more $CH_2$ groups may be replaced by O or S;

$Z^{21}$ is selected on each occurrence, identically or differently, from —CO—O—, —O—CO—, —$CF_2$—$CF_2$—, —$CF_2$—O—, —O—$CF_2$—, —$CH_2$—$CH_2$—, —CH═CH—, —CF═CF—, —CF═CH—, —CH═CF—, —C≡C—, —$OCH_2$—, —$CH_2$O— and a single bond; and $A^{21}$ is selected on each occurrence, identically or differently, from the following groups:

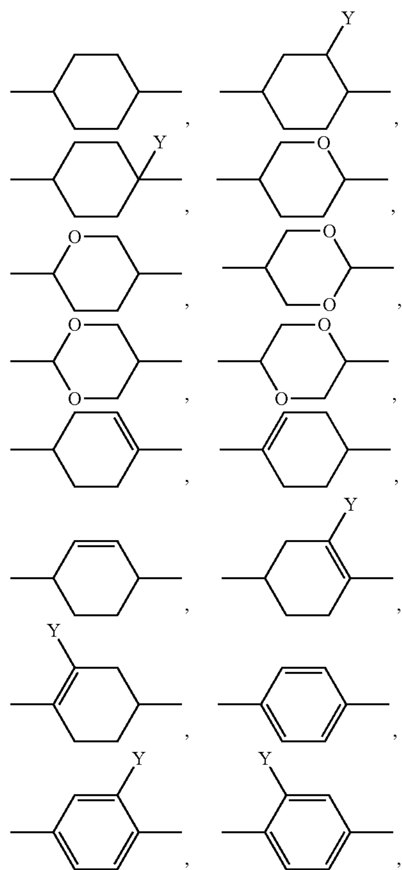

-continued

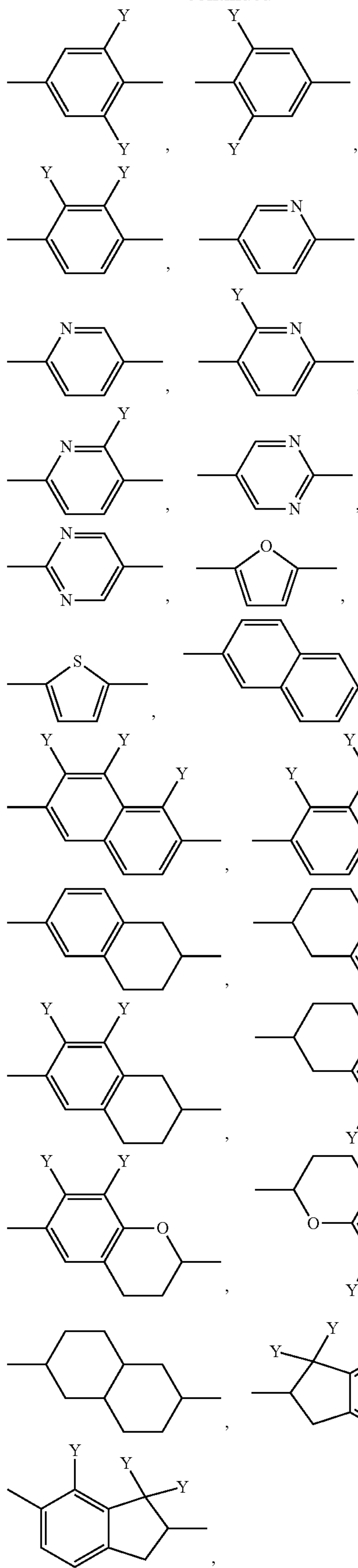

-continued

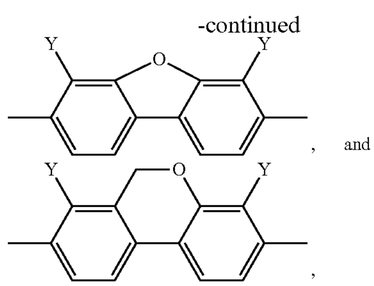

where

Y is selected on each occurrence, identically or differently, from F, Cl, CN, and alkyl, alkoxy or alkylthio groups having 1 to 10 C atoms, where one or more hydrogen atoms in the alkyl, alkoxy or alkylthio groups may be replaced by F or Cl, and where one or more $CH_2$ groups in the alkyl, alkoxy or alkylthio groups may be replaced by O or S.

16. A window according to claim 1, wherein the degree of anisotropy R of the dye compounds is greater than 0.4.

17. A window according to claim 1, wherein the dye compounds are selected from azo compounds, anthraquinones, methine compounds, azomethine compounds, merocyanine compounds, naphthoquinones, tetrazines, perylenes, terrylenes, quaterrylenes, higher rylenes, benzothiadiazoles, pyrromethenes and diketopyrrolopyrroles.

18. A window according to claim 1, which has an area extent of at least 0.5 $m^2$.

19. A window according to claim 1, where the device is electrically switchable.

20. A window according to claim 1, where the device has the following layer sequence, where further layers may additionally be present:

substrate layer
electrically conductive transparent layer
alignment layer
switching layer comprising the liquid-crystalline material
alignment layer
electrically conductive transparent layer
substrate layer.

21. A method comprising the step of including a liquid-crystalline material comprising at least three different dye compounds in a window suitable for regulating the passage of light in the form of daylight from the environment into a space, said window containing a switching device for regulating the passage of light between a bright state and a dark state, which does not comprise a polariser, where the liquid-crystalline material is incorporated in a layer of said switching device and has a clearing point of at least 95° C. and comprises at least one compound V as defined in claim 1 which contains at least one unit selected from units of the formulae (E-1), (E-2) and (E-3), as defined in claim 1.

* * * * *